United States Patent
Tang

(10) Patent No.: US 11,246,084 B2
(45) Date of Patent: Feb. 8, 2022

(54) METHOD FOR UPDATING SYSTEM INFORMATION, TERMINAL, AND NETWORK SIDE DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 444 days.

(21) Appl. No.: 16/305,509

(22) PCT Filed: Jul. 14, 2016

(86) PCT No.: PCT/CN2016/090025
§ 371 (c)(1),
(2) Date: Nov. 29, 2018

(87) PCT Pub. No.: WO2018/010144
PCT Pub. Date: Jan. 18, 2018

(65) Prior Publication Data
US 2021/0176698 A1 Jun. 10, 2021

(51) Int. Cl.
*H04W 48/16* (2009.01)
*H04L 12/24* (2006.01)

(52) U.S. Cl.
CPC ......... *H04W 48/16* (2013.01); *H04L 41/0813* (2013.01)

(58) Field of Classification Search
CPC .................. H04W 48/16; H04L 41/0813
See application file for complete search history.

(56) References Cited

U.S. PATENT DOCUMENTS 9,338,760 B2* 5/2016 Hegde .................. H04W 48/08
10,313,876 B2* 6/2019 Johansson ............. H04W 24/02
(Continued)

FOREIGN PATENT DOCUMENTS

CN       101212799 A      7/2008
CN       101873694 A     10/2010
(Continued)

OTHER PUBLICATIONS

3GPP TS 36.331 V13.0.0 (Dec. 2015) 3rd Generation Partnership Project; Technical Specification Group Radio Access Network; Evolved Universal Terrestrial Radio Access (E-UTRA); Radio Resource Control (RRC); Protocol specification (Release 13).
(Continued)

*Primary Examiner* — Duc C Ho

(57) ABSTRACT

Provided are a method for updating system information, a terminal, and a network side device. The method includes that: a terminal acquires at least one piece of indication information sent by a network side device, the at least one piece of indication information being configured to indicate that at least one system information group is updated, the at least one system information group being in one-to-one correspondence with the at least one piece of indication information, each system information group of the at least one system information group including at least one piece of system information; the terminal determines at least one piece of updated target system information in the at least one system information group; and the terminal acquires the at least one piece of updated target system information. The embodiments of the present disclosure indicate updates of different system information groups via different indication information.

18 Claims, 5 Drawing Sheets

(56) References Cited

U.S. PATENT DOCUMENTS

| | | | | |
|---|---|---|---|---|
| 10,743,237 | B2* | 8/2020 | Jha | H04W 48/12 |
| 2009/0316603 | A1* | 12/2009 | Amerga | H04W 48/08 |
| | | | | 370/254 |
| 2014/0293901 | A1* | 10/2014 | Hegde | H04W 48/16 |
| | | | | 370/329 |
| 2017/0251500 | A1* | 8/2017 | Agiwal | H04W 74/0833 |
| 2017/0374491 | A1 | 12/2017 | Xiao et al. | |

FOREIGN PATENT DOCUMENTS

| | | | |
|---|---|---|---|
| CN | 103313346 | A | 9/2013 |
| CN | 103906085 | A | 7/2014 |
| CN | 104010368 | A | 8/2014 |
| CN | 104780608 | A | 7/2015 |
| EP | 2525607 | A1 | 11/2012 |
| WO | 2011079469 | A1 | 7/2011 |
| WO | 2016095820 | A1 | 6/2016 |

OTHER PUBLICATIONS

3GPP TS 36.304 V13.0.0 (Dec. 2015) 3rd Generation Partnership Project; Technical Specification Group Radio Access Network; Evolved Universal Terrestrial Radio Access (E-UTRA); User Equipment(UE) procedures in idle mode (Release 13).
First Chinese Office Action dated Aug. 14, 2020; Application No. 201680087186.6.
First Indian Office Action dated Jun. 29, 2020; Application No. 201817047597.
Office Action dated Feb. 7, 2020; Application No. 106122646.
Mediatek Inc:"Evaluation on LIPA Availabolity Indication Solution", 3GPP Draft; S2-113240_evaluation on lipa indication solutions, 3rd generation partnership project (3GPP), Mobile competence centre; 650, Route des lucioles; F-06921 Sophia-antipolis cedex; France, vol. SA WG2, No. Naantali; Jul. 11, 2011.
Intel Corporation: "Email discussion report on [90#23][LTE/MTC-LC] SIB Contents", SGPP Draft; R2-153277—SIB Content Email Discussion Report 90-23, 3rd Generation Partnership Project(3GPP), Mobile Competence Centre; 650, Route Des Lucioles; f-06921 Sophia-Antipolis Cedex; Fran, vol. RAN WG2, No. Beijing, P.R. China; Aug. 24, 2015-Aug. 28, 2015.
Extended European Search Report for corresponding EP patent application No. 16908471.2, dated Mar. 14, 2019.
International Search Report for corresponding application PCT/CN2016/090025 filed on Jul. 14, 2016; dated Apr. 26, 2017.
The first examination report for the EP family application No. 16908471.2, dated Apr. 15, 2021.

* cited by examiner

200

S210: A terminal determines at least one system information group, the at least one system information group including at least one piece of system information S220: The terminal acquires at least one tag value group by monitoring at least one tag value message in one-to-one correspondence with the at least one system information group sent by the network side device, wherein the at least one tag value group is in one-to-one correspondence with the at least one system information group, each of the at least one tag value group includes at least one tag value, and at least one tag value included in each tag value group is in one-to-one correspondence with at least one piece of system information included in the corresponding system information group S230: The terminal determines, by comparing a tag value corresponding to each piece of system information in the at least one system information group sent by the network side device with a tag value of the corresponding system information stored by the terminal, at least one piece of updated target system information in the at least one system information group S240: The terminal acquires the at least one piece of updated target system information

S310: A network side device determines at least one piece of indication information, the at least one piece of indication information being configured to indicate that at least one system information group is updated, the at least one system information group being in one-to-one correspondence with the at least one piece of indication information, each of the at least one system information group including at least one piece of system information S320: The network side device sends the at least one piece of indication information

A network side device determines at least one system information group which is updated, each of the at least one system information group including at least one piece of system information ⟿ S410

The network side device sends at least one tag value message in one-to-one correspondence with the at least one system information group, wherein the at least one tag value group is in one-to-one correspondence with the at least one system information group, each of the at least one tag value group includes at least one tag value, and at least one tag value included in each tag value group is in one-to-one correspondence with at least one piece of system information included in the corresponding system information group ⟿ S420

Fig. 4

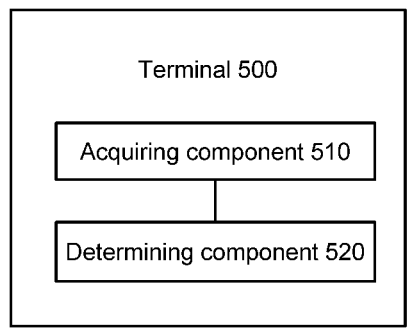

Fig. 5

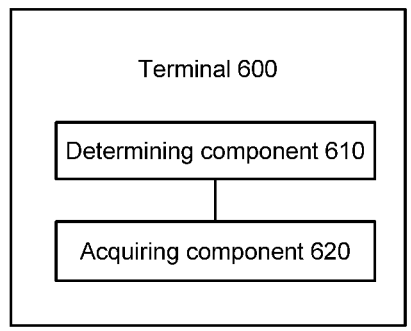

Fig. 6

METHOD FOR UPDATING SYSTEM INFORMATION, TERMINAL, AND NETWORK SIDE DEVICE

TECHNICAL FIELD

The present disclosure relates to the field of communications, and in particular to a method for updating system information, a terminal and a network side device.

BACKGROUND

In the existing Long Term Evolution (LTE) system, system information comprises different System Information Blocks (SIBs), such as SIB1, . . . , SIBx, and each SIB represents different system information. In the existing LTE standard, when User Equipment (UE) receives a paging message including update information (e.g., SystemInfoModification), the UE considers that all pieces of system information stored by the UE are invalid, and needs to re-read all pieces of system information to ensure a normal update. However, since not all pieces of system information are changed during the system information update process, the method for reading all pieces of system information increases the burden on the UE, resulting in low update efficiency.

SUMMARY

The embodiments of the present disclosure provide a method for updating system information, a terminal, and a network side device. Updates of different system information groups are indicated via different indication information, thus improving update efficiency.

A first aspect provides a method for updating system information. The method includes that: a terminal acquires at least one piece of indication information sent by a network side device, the at least one piece of indication information being configured to indicate that at least one system information group is updated, the at least one system information group being in one-to-one correspondence with the at least one piece of indication information, each of the at least one system information group including at least one piece of system information; the terminal determines at least one piece of updated target system information in the at least one system information group; and the terminal acquires the at least one piece of updated target system information.

In this solution, at least one piece of indication information is in one-to-one correspondence to at least one system information group. The indication information may indicate that one piece of system information is updated, may also indicate that a type of system information is updated, and may also indicate that multiple pieces of system information divided according to a certain manner are updated. The indication of the indication information can reduce the update range of updating system information by a terminal, or the indication of the indication information can reduce the search range of determining by the terminal updated target system information, thereby not only avoiding resource waste caused by blind update while improving update efficiency and shortening update delay. Further, the method is simple, easy to operate, has good compatibility with the related art, and has good expandability.

In a possible implementation manner of the first aspect, the at least one system information group includes a first system information group, at least one piece of system information included in the first system information group belongs to public system information, and the at least one piece of indication information includes first indication information for indicating that the first system information group is updated; and/or, the at least one system information group includes a second system information group, at least one piece of system information included in the second system information group belongs to private system information, and the at least one piece of indication information includes second indication information for indicating that the second system information group is updated.

In this solution, the system information group may include one type of system information, and indication information may indicate that one type of system information is updated. The terminal may update all system information in one type of system information indicated by the indication information, or the terminal may further determine which system information of the one type of system information is updated, which can improve update efficiency and shorten update delay.

In a possible implementation manner of the first aspect, the operation that the terminal acquires the at least one piece of indication information sent by the network side device may include that: the terminal determines at least one indication domain from at least two indication domains which are in one-to-one correspondence with at least two system information groups and are included in one indication message, wherein each of the at least two indication domains is configured to carry information indicating whether the corresponding system information group is updated, each of the at least one indication domain currently carries information indicating that the corresponding system information group is updated, and the at least two system information groups include the at least one system information group; and the terminal acquires the at least one piece of indication information from the at least one indication domain.

The updates of different system information groups are indicated by the information carried by different indication domains in one indication message, which can save signaling overhead and improve resource utilization.

In a possible implementation manner of the first aspect, the operation that the terminal acquires the at least one piece of indication information sent by the network side device may include that: the terminal acquires at least two indication messages in one-to-one correspondence with the at least two system information groups, wherein each of the at least two indication messages is configured to carry information indicating whether the corresponding system information group is updated, and the at least two system information groups include the at least one system information group; the terminal determines at least one indication message from the at least two indication messages, each of the at least one indication message currently carrying information indicating that the corresponding system information group is updated; and the terminal acquires the at least one piece of indication information from the at least one indication message.

The updates of different system information groups are indicated by different indication messages. The terminal can selectively receive the indication information required by the terminal according to actual situations, so as to improve the efficiency of acquiring the indication information by the terminal. Furthermore, information for indicating whether the corresponding system information is updated is carried in different messages, which can make the indication message have better compatibility and expandability.

In a possible implementation manner of the first aspect, the operation that the terminal acquires the at least two indication messages in one-to-one correspondence with the at least two system information groups may include that: the terminal acquires an indication message corresponding to each of the at least two system information groups from a first transmission resource for transmitting an indication message corresponding to each of the at least two system information groups, wherein indication messages of (corresponding to) different system information groups correspond to different first transmission resources; or, the terminal acquires an indication message corresponding to each of the at least two system information groups according to a first network temporary identity corresponding to the indication message corresponding to each of the at least two system information groups, wherein indication messages of (corresponding to) different system information groups correspond to different first network temporary identities.

The terminal may acquire required indication information in many manners, the burden on the terminal can be reduced, and the efficiency of acquiring the indication information by the terminal is improved, so that the terminal can shorten the delay of updating the system information.

In a possible implementation manner of the first aspect, the method may further include that: the terminal receives a first configuration message, the first configuration message including a corresponding relationship between an indication message corresponding to a system information group and a first transmission resource, or, the first configuration message including a corresponding relationship between an indication message corresponding to a system information group and a first network temporary identity.

The terminal may selectively receive own required indication information through a first configuration message, the burden on the terminal can be reduced, and the efficiency of acquiring the indication information by the terminal is improved.

In a possible implementation of the first aspect, the method further includes that: the terminal acquires at least one tag value group sent by the network side device, the at least one tag value group being in one-to-one correspondence with the at least one system information group, each of the at least one tag value group including at least one tag value, and at least one tag value included in each of the at least one tag value group being in one-to-one correspondence with at least one piece of system information included in the corresponding system information group, wherein the operation that the terminal determines at least one piece of updated target system information in the at least one system information group includes that: the terminal compares a tag value corresponding to each piece of system information in the at least one system information group sent by the network side device with a tag value of the corresponding system information stored by the terminal, and determines at least one piece of updated target system information in the at least one system information group.

The terminal determines the at least one piece of target system information according to the tag value group corresponding to the system information group, so that unnecessary system information update can be avoided, and the required system information group is normally updated, thereby improving update efficiency, and avoiding resource waste caused by a blind update.

In a possible implementation manner of the first aspect, the at least one system information group includes multiple system information groups, the at least one tag value group includes multiple tag value groups in one-to-one correspondence with the multiple system information groups, and the operation that the terminal acquires at least one tag value group sent by the network side device includes that: the terminal acquires the multiple tag value groups from one tag value message; or, the terminal acquires multiple tag value messages in one-to-one correspondence with the multiple system information groups, wherein each of the multiple tag value messages is configured to carry a tag value group corresponding to the corresponding system information group.

Multiple tag value groups are carried in different information domains of one tag value message, which can improve resource utilization and reduce signaling overhead. Multiple tag value groups are carried in multiple tag value messages, and the terminal can selectively receive a tag value message corresponding to own required system information, thereby improving the efficiency of updating the system information by the terminal. Further, the tag value group is flexible in carrying mode, and has good compatibility and expandability.

In a possible implementation manner of the first aspect, the operation that the terminal acquires multiple tag value messages in one-to-one correspondence with the multiple system information groups may include that: the terminal acquires a tag value message corresponding to each of the multiple system information groups from a second transmission resource for transmitting a tag value message corresponding to each of the multiple system information groups, wherein tag value messages of (corresponding to) different system information groups correspond to different second transmission resources; or, the terminal acquires a tag value message corresponding to each of the multiple system information groups according to a second network temporary identity corresponding to the tag value message corresponding to each of the multiple system information groups, wherein tag value messages of (corresponding to) different system information groups correspond to different second network temporary identities.

The terminal may selectively acquire a tag value group corresponding to an own required system information group in many manners, the burden on the terminal can be reduced, and the efficiency of acquiring the tag value group by the terminal is improved, so that the terminal can shorten the delay of updating the system information.

In a possible implementation manner of the first aspect, the method further includes that: the terminal receives a second configuration message, the second configuration message including a corresponding relationship between a tag value message of (corresponding to) a system information group and a second transmission resource, or, the second configuration message including a corresponding relationship between a tag value message of (corresponding to) a system information group and a second network temporary identity.

The terminal may selectively acquire a tag value group corresponding to an own required system information group through a second configuration message, the burden on the terminal to acquire the tag value group can be reduced, and the efficiency of acquiring the tag value group is improved.

In a possible implementation of the first aspect, the operation that the terminal acquires the at least one piece of indication information sent by the network side device may include that: the terminal determines the at least one system information group; and the terminal monitors indication information corresponding to each of the at least one system information group.

The terminal can determine the at least one system information group first, and then monitor indication information corresponding to the at least one system information group, so that the terminal can update the at least one system group in time.

In an alternative embodiment, in a possible implementation manner of the first aspect, the terminal may determine the at least one system information group according to a service requirement.

The terminal may monitor indication information corresponding to an own required system information group on a corresponding transmission resource according to a service requirement, and the terminal can also monitor indication information corresponding to an own required system information group on the basis of a corresponding first network temporary identity according to a service requirement. The terminal may merely monitor the indication information corresponding to the own required system information group, so that the terminal can update the system information group that needs to be used in time.

In an alternative embodiment, in an implementation manner of the first aspect, the indication message and the tag value message may include a paging message or a physical control channel message; the first configuration message and the second configuration message may include an MIB message or an SIB message.

In an alternative embodiment, in a possible implementation manner of the first aspect, the method may further include that: the terminal acquires a configuration message sent by the network side device, wherein the configuration message may include a corresponding relationship between a system information group and a transmission resource; or the configuration message may include a corresponding relationship between a system information group and a network temporary identity, and the terminal acquires, according to the configuration message, an indication message of a required system information group, a tag value message, or other information or messages related to the system information group.

In an alternative embodiment, in a possible implementation manner of the first aspect, the transmission resource may include at least one of a time domain resource, a frequency domain resource, or a space domain resource.

A second aspect provides a method for updating system information. The method includes that: a terminal determines at least one system information group, each of the at least one system information group including at least one piece of system information; the terminal acquires at least one tag value group by monitoring at least one tag value message in one-to-one correspondence with the at least one system information group sent by the network side device, wherein the at least one system information group is in one-to-one correspondence with the at least one tag value group, each of the at least one tag value group includes at least one tag value, and at least one tag value included in each tag value group is in one-to-one correspondence with at least one piece of system information included in the corresponding system information group; the terminal determines, by comparing a tag value corresponding to each piece of system information in the at least one system information group sent by the network side device with a tag value of the corresponding system information stored by the terminal, at least one piece of updated target system information in the at least one system information group; and the terminal acquires the at least one piece of updated target system information.

The terminal can monitor a tag value message corresponding to an own required system information group, so as to timely determine whether the own required system information group is updated according to a tag value group carried in the tag value message, so that the update efficiency of system information can be improved, and the update delay can be shortened.

In an alternative embodiment, in a possible implementation manner of the second aspect, the terminal determines the at least one system information group according to a service requirement.

In a possible implementation manner of the second aspect, the operation that the terminal acquires the at least one tag value group by monitoring the at least one tag value message in one-to-one correspondence with the at least one system information group sent by the network side device includes that: the terminal acquires the at least one tag value group by monitoring a corresponding tag value message on a second transmission resource for transmitting a tag value message corresponding to each of the at least one system information group, wherein tag value messages corresponding to different system information groups correspond to different second transmission resources; or, the terminal acquires the at least one tag value group by monitoring a corresponding tag value message through a second network temporary identity corresponding to a tag value message corresponding to each of the at least one system information group, wherein tag value messages corresponding to different system information groups correspond to different second network temporary identities.

The terminal can monitor a tag value message corresponding to an own required system information group in many manners, so that the efficiency of acquiring the tag value group of the own required system information group by the terminal can be improved.

In a possible implementation of the second aspect, the tag value message includes a paging message or a physical control channel message.

The terminal may acquire a tag value of own required system information by monitoring a corresponding paging message or physical control channel message, so that the terminal can update the own required system information in time.

In an alternative embodiment, in a possible implementation manner of the second aspect, the method further includes that: the terminal receives a second configuration message, the second configuration message including a corresponding relationship between a tag value message of (corresponding to) a system information group and a second transmission resource, or, the second configuration message including a corresponding relationship between a tag value message of (corresponding to) a system information group and a second network temporary identity.

In an alternative embodiment, in a possible implementation manner of the second aspect, the method may further include that: the terminal acquires a configuration message sent by the network side device, wherein the configuration message may include a corresponding relationship between a system information group and a transmission resource; or the configuration message may include a corresponding relationship between a system information group and a network temporary identity, and the terminal acquires, according to the configuration message, a tag value message of a required system information group, or other information or messages related to the system information group.

In an alternative embodiment, in a possible implementation manner of the second aspect, the transmission resource may include at least one of a time domain resource, a frequency domain resource, or a space domain resource.

A third aspect provides a method for updating system information. The method includes that: a network side device determines at least one piece of indication information, the at least one piece of indication information being configured to indicate that at least one system information group is updated, the at least one system information group being in one-to-one correspondence with the at least one piece of indication information, each system information group of the at least one system information group including at least one piece of system information; and the network side device sends the at least one piece of indication information.

In this solution, at least one piece of indication information is in one-to-one correspondence with at least one system information group. The indication information may indicate that one piece of system information is updated, may also indicate that one type of system information is updated, and may also indicate that multiple pieces of system information divided according to a certain manner are updated. The indication of the indication information can reduce the update range of updating system information by a terminal, or the indication of the indication information can reduce the search range of determining by the terminal updated target system information, thereby not only avoiding resource waste caused by the blind update while improving update efficiency and shortening update delay. Further, the method is simple, easy to operate, has good compatibility with the related art, and has good expandability.

In a possible implementation manner of the third aspect, the at least one system information group includes a first system information group, at least one piece of system information included in the first system information group belongs to public system information, and the at least one piece of indication information includes first indication information for indicating whether the first system information group is updated; and/or, the at least one system information group includes a second system information group, at least one piece of system information included in the second system information group belongs to private system information, and the at least one piece of indication information includes second indication information for indicating whether the second system information group is updated.

In this solution, the indication information may indicate that one type of system information is updated. Thus, the terminal may update all system information in the one type of system information indicated by the indication information; or, the terminal may further determine which system information in the one type of the system information is updated, which can improve update efficiency and shorten update delay.

In a possible implementation manner of the third aspect, the operation that the network side device sends the at least one piece of indication information includes that: the network side device sends the at least one piece of indication information through one indication message, wherein the one indication message includes at least two indication domains in one-to-one correspondence with at least two system information groups, each of the at least two indication domains is configured to carry information indicating whether the corresponding system information group is updated, the at least two indication domains include at least one indication domain, the at least one indication domain carries the at least one piece of indication information in a one-to-one correspondence manner, and the at least two system information groups include the at least one system information group.

The updates of different system information groups are indicated by information carried by different information domains in the one indication message, which can save signaling overhead and improve resource utilization.

In a possible implementation manner of the third aspect, the operation that the network side device sends the at least one piece of indication information includes that: the network side device sends at least two indication messages in one-to-one correspondence with at least two system information groups, wherein each of the at least two indication messages is configured to carry information indicating whether the corresponding system information group is updated, the at least two indication messages include at least one indication message, the at least one indication message carries the at least one piece of indication information in a one-to-one correspondence manner, and the at least two system information groups include the at least one system information group.

Information for indicating whether the corresponding system information is updated is carried in different messages, so that the terminal can acquire an indication message of an own required system information group, and the indication message can have better compatibility and expandability.

In a possible implementation manner of the third aspect, the operation that the network side device sends at least two indication messages in one-to-one correspondence with the at least two system information groups includes that: the network side device sends an indication message corresponding to each of the at least two system information groups on a first transmission resource for transmitting an indication message corresponding to each of the at least two system information groups, wherein indication messages corresponding to different system information groups correspond to different first transmission resources; or, the network side device sends an indication message corresponding to each of the at least two system information groups according to a first network temporary identity corresponding to the indication message corresponding to each of the at least two system information groups, wherein indication messages corresponding to different system information groups correspond to different first network temporary identities.

The network side device may send indication information in many manners, so that the terminal can acquire the indication information of own required system information according to an own requirement, thereby improving the efficiency of updating the system information.

In a possible implementation manner of the third aspect, the network side device sends a first configuration message, the first configuration message including a corresponding relationship between an indication message corresponding to a system information group and a first transmission resource, or, the first configuration message including a corresponding relationship between an indication message corresponding to a system information group and a first network temporary identity.

The network side device may send a first configuration message, so that the terminal selectively receives own required indication message, the burden on the terminal can be reduced, and the efficiency of acquiring the indication information by the terminal is improved.

In a possible implementation of the third aspect, the network side device sends at least one tag value group, the at least one tag value group being in one-to-one correspondence with the at least one system information group, each of the at least one tag value group including at least one tag value, and at least one tag value included in each tag value group being in one-to-one correspondence with at least one piece of system information included in the corresponding system information group.

The network side device sends a tag value group corresponding to a system information group to the terminal, so that the terminal can avoid unnecessary system information update, can normally update the required system information, can improve update efficiency, and can avoid resource waste caused by the blind update.

In a possible implementation manner of the third aspect, the at least one system information group includes multiple system information groups, the at least one tag value group includes multiple tag value groups in one-to-one correspondence with the multiple system information groups, and the operation that the network side device sends at least one tag value group includes that: the network side device sends one tag value message carrying the multiple tag value groups; or, the network side device sends multiple tag value messages in one-to-one correspondence with the multiple system information groups, wherein each of the multiple tag value messages is configured to carry a tag value group corresponding to the corresponding system information group.

Multiple tag value groups are carried in different information domains of the one tag value message, which can improve resource utilization and reduce signaling overhead. Multiple tag value groups are carried in multiple tag value messages, and the terminal can selectively receive a tag value message corresponding to own required system information, thereby improving the efficiency of updating the system information by the terminal. Further, the tag value group is flexible in carrying mode, and has good compatibility and expandability.

In a possible implementation manner of the third aspect, the operation that the network side device sends multiple tag value messages in one-to-one correspondence with the multiple system information groups includes that: the network side device sends a tag value message corresponding to each of the multiple system information groups on a second transmission resource for transmitting a tag value message corresponding to each of the multiple system information groups, wherein tag value messages corresponding to different system information groups correspond to different second transmission resources; or, the network side device sends a tag value message corresponding to each of the multiple system information groups according to a second network temporary identity corresponding to the tag value message corresponding to each of the multiple system information groups, wherein tag value messages corresponding to different system information groups correspond to different second network temporary identities.

The network side device may send a tag value group in many manner, so that the terminal may selectively acquire a tag value group corresponding to an own required system information group in many manners, the burden on the terminal can be reduced, and the efficiency of acquiring the tag value group by the terminal is improved.

In a possible implementation manner of the third aspect, the method further includes that: the network side device sends a second configuration message, the second configuration message including a corresponding relationship between a tag value message corresponding to a system information group and a second transmission resource, or, the second configuration message including a corresponding relationship between a tag value message corresponding to a system information group and a second network temporary identity.

The network side device may send a second configuration message, so that the terminal may selectively acquire a tag value group corresponding to an own required system information group, the burden on the terminal to acquire the tag value group can be reduced, and the efficiency of acquiring the tag value group by the terminal is improved.

In an alternative embodiment, in a possible implementation manner of the third aspect, the indication message and the tag value message may include a paging message or a physical control channel message; the first configuration message and the second configuration message may include an MIB message or an SIB message.

In an alternative embodiment, in a possible implementation manner of the third aspect, the transmission resource may include at least one of a time domain resource, a frequency domain resource, or a space domain resource.

In an alternative embodiment, in a possible implementation manner of the third aspect, the method may further include that: the network side device sends a configuration message, wherein the configuration message may include a corresponding relationship between a system information group and a transmission resource; or the configuration message may include a corresponding relationship between a system information group and a network temporary identity, so that the terminal acquires, according to the configuration message, an indication message of a required system information group, a tag value message, or other information or messages related to the system information group.

A fourth aspect provides a method for updating system information. The method includes that: a network side device determines at least one system information group which is updated, each of the at least one system information group including at least one piece of system information; and the network side device sends at least one tag value group by sending at least one tag value message in one-to-one correspondence with the at least one system information group, wherein the at least one tag value group is in one-to-one correspondence with the at least one system information group, each of the at least one tag value group includes at least one tag value, and at least one tag value included in each tag value group is in one-to-one correspondence with at least one piece of system information included in the corresponding system information group.

The network side device sends a tag value group corresponding to the updated system information group, which not only reduces the burden on the network side device, but also reduces the burden on the terminal and improves resource utilization.

In a possible implementation of the fourth aspect, the tag value message includes a paging message or a physical control channel message.

The network side device may send a tag value group through a paging message or a physical control channel message, so that the terminal can monitor whether the tag value group corresponding to the own required system information group is updated, and the terminal can update the own required system information group in time.

In a possible implementation manner of the fourth aspect, the at least one system information group includes at least two system information groups, and the operation that the network side device sends at least one tag value message in one-to-one correspondence with the at least one system information group includes that: the network side device sends a tag value message corresponding to each of the at least two system information groups on a second transmission resource for transmitting a tag value message corresponding to each of the at least two system information groups, wherein tag value messages corresponding to different system information groups correspond to different second transmission resources; or, the network side device sends a tag value message corresponding to each of the at least two system information groups according to a second network temporary identity corresponding to the tag value message corresponding to each of the at least two system information groups, wherein tag value messages corresponding to different system information groups correspond to different second network temporary identities.

The network side device can send a tag value message corresponding to the system information group in many manners, so that the terminal can monitor the tag value message corresponding to an own required system information group by using the corresponding method, thereby improving the efficiency of acquiring the tag value group of the own required system information group by the terminal.

In an alternative embodiment, in a possible implementation manner of the fourth aspect, the transmission resource may include at least one of a time domain resource, a frequency domain resource, or a space domain resource.

In an alternative embodiment, in a possible implementation manner of the fourth aspect, the method may further include that: the network side device sends a configuration message, wherein the configuration message may include a corresponding relationship between a system information group and a transmission resource; or the configuration message may include a corresponding relationship between a system information group and a network temporary identity, so that the terminal acquires, according to the configuration message, an indication message, a tag value message corresponding to a required system information group, or other information or messages related to the system information group.

A fifth aspect provides a terminal for performing the method in the first aspect or any possible implementation manner of the first aspect. In an alternative embodiment, the terminal includes a component and/or element for performing the method in the first aspect or any possible implementation manner of the first aspect.

A sixth aspect provides a terminal for performing the method in the second aspect or any possible implementation manner of the second aspect. In an alternative embodiment, the terminal includes a component and/or element for performing the method in the second aspect or any possible implementation manner of the second aspect.

A seventh aspect provides a network-side terminal for performing the method in the third aspect or any possible implementation manners of the third aspect. In an alternative embodiment, the network side device includes a component and/or element for performing the method in the third aspect or any possible implementation manner of the third aspect.

An eighth aspect provides a network-side terminal for performing the method in the fourth aspect or any possible implementation manners of the fourth aspect. In an alternative embodiment, the network side device includes a component and/or element for performing the method in the fourth aspect or any possible implementation manner of the fourth aspect.

A ninth aspect provides a terminal. The terminal includes a transceiver, a memory, a processor, and a bus system. The transceiver, the memory and the processor are connected through a bus system, the memory is configured to store an instruction, the processor is configured to execute the instruction stored in the memory to control the transceiver to transmit and send a signal, and when the processor executes the instruction stored in the memory, the processor is enabled to perform the method in the first aspect or any possible implementation manner of the first aspect.

A tenth aspect provides a terminal. The terminal includes a transceiver, a memory, a processor, and a bus system. The transceiver, the memory and the processor are connected through a bus system, the memory is configured to store an instruction, the processor is configured to execute the instruction stored in the memory to control the transceiver to transmit and send a signal, and when the processor executes the instruction stored in the memory, the processor is enabled to perform the method in the second aspect or any possible implementation manner of the second aspect.

An eleventh aspect provides a network side device. The network side device includes a transceiver, a memory, a processor, and a bus system. The transceiver, the memory and the processor are connected through a bus system, the memory is configured to store an instruction, the processor is configured to execute the instruction stored in the memory to control the transceiver to transmit and send a signal, and when the processor executes the instruction stored in the memory, the processor is enabled to perform the method in the third aspect or any possible implementation manner of the third aspect.

A twelfth aspect provides a network side device. The network side device includes a transceiver, a memory, a processor, and a bus system. The transceiver, the memory and the processor are connected through a bus system, the memory is configured to store an instruction, the processor is configured to execute the instruction stored in the memory to control the transceiver to transmit and send a signal, and when the processor executes the instruction stored in the memory, the processor is enabled to perform the method in the fourth aspect or any possible implementation manner of the fourth aspect.

A thirteenth aspect provides a computer-readable storage medium for storing a computer program, the computer program including an instruction for performing the method in the first aspect or any possible implementation manner of the first aspect.

A fourteenth aspect provides a computer-readable storage medium for storing a computer program, the computer program including an instruction for performing the method in the second aspect or any possible implementation manner of the second aspect.

A fifteenth aspect provides a computer-readable storage medium for storing a computer program, the computer program including an instruction for performing the method in the third aspect or any possible implementation manner of the third aspect.

A sixteenth aspect provides a computer-readable storage medium for storing a computer program, the computer program including an instruction for performing the method in the fourth aspect or any possible implementation manner of the fourth aspect.

BRIEF DESCRIPTION OF THE DRAWINGS

FIG. 2 is a schematic flowchart of a method for updating system information according to another embodiment of the present disclosure;

FIG. 3 is a schematic flowchart of a method for updating system information according to yet another embodiment of the present disclosure;

FIG. 4 is a schematic flowchart of a method for updating system information according to a further embodiment of the present disclosure;

FIG. 5 is a schematic block diagram of a terminal according to an embodiment of the present disclosure;

FIG. 6 is a schematic block diagram of a terminal according to another embodiment of the present disclosure;

DETAILED DESCRIPTION OF THE EMBODIMENTS

The technical solutions in the embodiments of the present disclosure are clearly and completely described in the following with reference to the accompanying drawings in the embodiments of the present disclosure. It is apparent that the described embodiments are a part of the embodiments of the present disclosure, but not all of the embodiments. All other embodiments obtained by those skilled in the art based on the embodiments of the present disclosure without creative efforts fall within the scope of protection of the present disclosure.

The present disclosure describes various embodiments in conjunction with a terminal. The terminal may be referred to as a UE, a Mobile Station (MS), a mobile terminal, etc., and the terminal may communicate with one or more core networks through a Radio Access Network (RAN). For example, the terminal may be a mobile phone (or a "cellular" phone), a computer with a mobile terminal, etc. For example, the terminal may also be a portable, pocket-sized, hand-held, computer-integrated or in-vehicle mobile terminal and a terminal in a future 5G network that exchange voice and/or data with the RAN.

In addition, the present disclosure describes various embodiments in conjunction with a network side device. The network side device may be an Evolutional Node B (eNB or e-NodeB), a macro base station, a micro base station (also referred to as a "small base station"), a pico base station, an Access Point (AP), or a Transmission Point (TP), etc. in an LTE system or an evolved system thereof or in a future 5G network. This is not limited in the present disclosure.

It is to be understood that the technical solutions of the embodiments of the present disclosure may be applied to various communication systems such as LTE or 5G systems, and may also be applied to other communication systems.

It is to be understood that the embodiments of the present disclosure describe various embodiments in connection with system information. The system information may include at least two types: one is public system information. The public system information may include system basic parameters, cell selection or resident information, cell re-selection information, etc., and the network side device broadcasts basic system parameters to all terminals in the network through the public system information. The type of system information is basic information that the terminal resides and accesses the network, and the other type is private system information. The private system information is system information based on a terminal or a terminal service. The private system information may include system information related to an Enhanced Multimedia Broadcast/Multicast Service A (E-MBMS), system information related to Device-to-Device (D2D), and the like. The private system information is not the basic information that the terminal resides and accesses the network. The terminal may merely request and receive the own required private system information.

Figure 1:
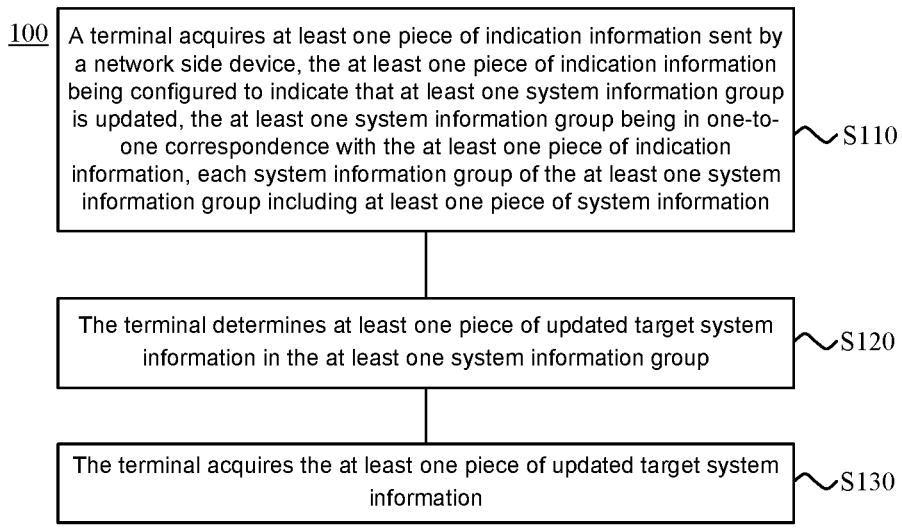
FIG. 1 is a schematic flowchart of a method for updating system information according to an embodiment of the present disclosure.

FIG. 1 is a schematic flowchart of a method for updating system information according to an embodiment of the present disclosure. As shown in FIG. 1, the method 100 may include the following operations.

At S110, a terminal acquires at least one piece of indication information sent by a network side device, the at least one piece of indication information being configured to indicate that at least one system information group is updated, the at least one system information group being in one-to-one correspondence with the at least one piece of indication information, each of the at least one system information group including at least one piece of system information.

At S120, the terminal determines at least one piece of updated target system information in the at least one system information group.

At S130, the terminal acquires the at least one piece of updated target system information.

In an alternative embodiment, the indication information in the embodiments of the present disclosure can indicate that a system information group is updated. The system information group may include at least the following situations:

Situation 1:

In an alternative embodiment, as an example, different system information groups include different types of system information. For example, the at least one system information group includes a first system information group, at least one piece of system information included in the first system information group belongs to public system information, and the at least one piece of indication information includes first indication information for indicating that the first system information group is updated; and/or, the at least one system information group includes a second system information group, at least one piece of system information included in the second system information group belongs to private system information, and the at least one piece of indication information includes second indication information for indicating that the second system information group is updated.

In an alternative embodiment, each system information group includes one type of system information, the indication information corresponding to each system information group can be used to indicate that the corresponding type of system information is updated, and the update range of updating the system information can be reduced; or, the terminal determines at least one piece of target system information that needs to be updated in the updated type of system information, so that the efficiency of determining, by the terminal, the target system information that needs to be updated can be improved.

Situation 2:

In an alternative embodiment, as an example, each system information group includes one piece of system information. The indication information corresponding to the each system information group is configured to indicate that the one corresponding system information is updated, and the update range of updating the system information can be further reduced. The terminal determines at least one piece of target system information that needs to be updated in the updated system information, so that the efficiency of determining, by the terminal, the target system information that needs to be updated can be further improved.

Situation 3:

In an alternative embodiment, as an example, the content included in each system information group may be pre-approved by the terminal and the network side device, or may be indicated by the network side device to the terminal. For example, the first system information group in at least one system information group includes a part of public system information, and the second system information group in the at least one system information group includes a part of private system information and the like.

In this solution, each piece of indication information is configured to indicate that the corresponding system information group is updated, and thus the terminal may determine at least one piece of updated target system information (or needing to be updated). In other words, the indication information in this solution is configured to indicate that a part of the system information is updated, which can avoid resource waste caused by blindly updating all pieces of system information, improve update efficiency and shorten update delay.

In the above, it is described that the terminal can acquire the at least one piece of updated target system information according to at least one piece of indication information from an overall perspective with reference to FIG. 1. The operation that the terminal acquires the at least one piece of indication information may at least include the following two manners:

Manner 1: (The Terminal Acquires the at Least One Piece of Indication Information by Using an Indication Domain Included in One Message)

A system information group and an indication domain have a corresponding relationship. For example, when there are M system information groups, the M system information groups correspond to M indication domains one by one. The one indication message received by the terminal may include L indication domains, where 2≤M, 0≤L≤M. In other words, the indication message received by the terminal may include M indication domains corresponding to the M system information groups, and each indication domain carries information indicating whether the corresponding system information group is updated. The indication message received by the terminal may further include an indication domain corresponding to the system information group which is updated (that is, the indication domain corresponding to the system information which is not updated in the indication message may not appear). For example, there are M system information groups, and merely one system information group of the M system information groups is updated, and the indication message received by the terminal may include merely an indication domain of the updated system information group, and indication domains of the remaining M−1 system information groups do not appear.

In an alternative embodiment, as an example, the operation that a terminal acquires at least one piece of indication information sent by a network side device may include that: the terminal determines at least one indication domain from at least two indication domains which are in one-to-one correspondence with at least two system information groups and are included in one indication message, wherein each of the at least two indication domains is configured to carry information indicating whether the corresponding system information group is updated, each of the at least one indication domain currently carries information indicating that the corresponding system information group is updated, and the at least two system information groups include the at least one system information group; and the terminal acquires the at least one piece of indication information from the at least one indication domain.

In an alternative embodiment, the indication message sent by the network side device and acquired by the terminal may include at least two indication domains, wherein each of the at least two indication domains is configured to indicate whether one type of system information is updated (i.e., each system information group includes one type of system information). For example, the indication message includes a public indication domain corresponding to the public system information and a private indication domain corresponding to the private system information. Table 1 shows a possible indication manner of the public indication domain and the private indication domain. As shown in Table 1, each indication domain carries an indication domain value. When the indication domain value is 0, it indicates that no update occurs. When the indication domain value is 1, it indicates that an update occurs.

TABLE 1

| System information type | Indication domain value | Meaning |
| --- | --- | --- |
| First system information group (public system information) | 0 | Not update |
|  | 1 | Update |
| Second system information group (private system information) | 0 | Not update |
|  | 1 | Update |

After the terminal receives the indication message sent by the network side device, the indication message includes at least two indication domains in one-to-one correspondence with the at least two system information groups, and the terminal may determine at least one indication domain according to the indication domain value of each of the at least two indication domains. The at least one indication domain carries the at least one piece of indication information in a one-to-one correspondence manner.

For example, the indication message received by the terminal includes a public indication domain and a private indication domain, wherein the indication domain value of the public indication domain is 0, and the indication domain value of the private indication domain is 1. After receiving the indication message, the terminal acquires, according to the dedicated indication domain, indication information indicating that the private system information is updated.

In an alternative embodiment, the indication message may include at least two indication domains, wherein each of the at least two indication domains is configured to indicate whether the corresponding system information is updated (i.e., each system information group includes merely one piece of system information). For example, the indication message includes a first indication domain corresponding to cell re-selection information and a second indication domain corresponding to D2D system information. Table 2 is a possible indication manner of different indication domains in an indication message. As shown in Table 2, each indication domain carries an indication domain value. When the indication domain value is 0, it indicates that no update occurs. When the indication domain value is 1, it indicates that an update occurs.

TABLE 2

| System information type | Indication domain value | Meaning |
| --- | --- | --- |
| SIBx (SIx) | 0 | Not update |
|  | 1 | Update |

Each SIBx or System Information (SIx) has a separate indication domain. Each indication domain is configured to carry information indicating whether the corresponding system information is updated. After the terminal receives the indication message sent by the network side device, the indication message includes at least two indication domains corresponding to the at least two system information groups, and the terminal may determine at least one indication domain according to the indication domain values of the at least two indication domains. The at least one indication domain carries the at least one piece of indication information in a one-to-one correspondence manner.

For example, the indication message received by the terminal includes N indication domains, where the N indication domains are used to indicate whether N pieces of system information is updated in a one-to-one correspondence manner, and the N indication domains have N-x indication domains for indicating that corresponding system information is updated. After receiving the indication message, the terminal may acquire N-x pieces of indication information for indicating that the N-x pieces of system information are updated from the N-x indication domains, and the N-x pieces of system information are in one-to-one correspondence with the N-x pieces of indication information, where 2≤N, 0≤x<N.

In an alternative embodiment, as an example, the at least two indication domains may be a dynamic indication domain. According to the configuration or the agreement, the indication domain itself may be used to indicate whether the corresponding system information group is updated. For example, when the indication domain corresponding to the first system information group in the indication message does not exist, it may be indicated that the first system information group is been updated; when the indication message includes the indication domain corresponding to the second system information group, regardless of the value of the indication domain corresponding to the second system information group, the second system information group is considered to be updated.

Manner 2: (The Terminal Acquires the at Least One Piece of Indication Information Through Different Messages)

In an alternative embodiment, as an example, the operation that the terminal acquires at least one piece of indication information sent by the network side device may include that: the terminal acquires at least two indication messages in one-to-one correspondence with the at least two system information groups, wherein each of the at least two indication messages is configured to carry information indicating whether the corresponding system information group is updated, and the at least two system information groups include the at least one system information group; the terminal determines at least one indication message from the at least two indication messages, each of the at least one indication message currently carrying information indicating that the corresponding system information group is updated; and the terminal acquires the at least one piece of indication information from the at least one indication message.

For example, the terminal receives N indication messages, and each of the N indication messages is configured to carry information indicating whether the corresponding system information group is updated, wherein when there are N-x indication messages for carrying information indicating that the corresponding system information group are updated in the N indication messages, the terminal may acquire N-x pieces of indication information from the N-x indication messages (in other words, the N-x indication messages carry the N-x pieces of indication information in a one-to-one correspondence manner), where 2≤N, 0≤x<N.

It is to be noted the situation that the terminal receives at least two indication messages is for illustrative purposes and should not be construed as to limit the present disclosure. In fact, the terminal may receive one indication message carrying the indication information (i.e., the terminal receives one indication message, and the one indication message carries information indicating that the corresponding system information is updated).

Further, as an example, the operation that the terminal acquires at least two indication messages in one-to-one correspondence with the at least two system information groups may include the following operations.

The terminal acquires an indication message corresponding to each of the at least two system information groups from a first transmission resource for transmitting an indication message corresponding to each of the at least two system information groups, wherein indication messages of (corresponding to) different system information groups correspond to different first transmission resources; or, the terminal acquires an indication message corresponding to each of the at least two system information groups according to a first network temporary identity corresponding to the indication message corresponding to each of the at least two system information groups, wherein indication messages of (corresponding to) different system information groups correspond to different first network temporary identities.

In an alternative embodiment, the indication messages corresponding to different system information groups are transmitted through different transmission resources. The terminal can receive the corresponding indication message on the corresponding transmission resource, and the terminal can thus acquire the at least one piece of indication information from the received indication message. For example, the system information group includes one type of system information. The terminal may receive, on a first transmission resource for transmitting a public indication message corresponding to public system information, the public indication message, and receive, on a first transmission resource for transmitting a private indication message corresponding to private system information, the private indication message. Thus, the terminal may determine the at least one piece of indication information according to the information carried by the public indication message and the information carried by the private indication message.

For another example, indication messages corresponding to different system information groups correspond to different first network temporary identities. Indication messages corresponding to different system information groups may be identified by different first network temporary identities. The network temporary identity may include a Radio Network Temporary Identity (RNTI). For example, the at least two indication messages include a public indication message and a private indication message, wherein the public indication message is scrambled by a first network temporary identity RNTI1, and the private indication message is scrambled by a second network temporary identity RNTI2. After receiving an indication message A, the terminal descrambles the indication message A through the RNTI1, it is indicated that the indication message A is a public indication message for indicating whether the public system information is updated. After receiving an indication message B, the terminal descrambles the indication message B through the RNTI2, it is indicated that the indication message B is a private indication message for indicating whether the private system information is updated. Furthermore, the terminal can determine the at least one piece of indication information from the information carried in the public indication message and the information carried in the private indication message.

In an alternative embodiment, the network temporary identity may include a Cell Radio Network Temporary Identifier (C-RNTI), a Semi Persistent Scheduling RNTI (SPS-RNTI), a System Information RNTI (SI-RNTI), and a Random Access RNTI (RA-RNTI).

In an alternative embodiment, as an example, the method may further include that: the terminal receives a first configuration message, the first configuration message including a corresponding relationship between an indication message of (corresponding to) a system information group and a first transmission resource, or, the first configuration message including a corresponding relationship between an indication message of (corresponding to) a system information group and a first network temporary identity.

After receiving the first configuration message, the terminal can receive, on a corresponding transmission resource, an indication message corresponding to a system information group related to an own requirement (service requirement); or receive, according to the corresponding first network temporary identity, an indication message corresponding to a system information group related to an own requirement.

In an alternative embodiment, as an example, the operation that the terminal acquires at least one piece of indication information sent by the network side device may include that: the terminal determines the at least one system information group; and the terminal monitors indication information corresponding to each of the at least one system information group.

In an alternative embodiment, the terminal can determine at least one system information group (according to an own service requirement), and monitor at least one piece of indication information in one-to-one correspondence with the at least one system information group, so that the terminal can timely update the system information group to be used. For example, all terminals monitor one piece of indication information corresponding to the public system information (this one indication information is configured to indicate that one type of system information belonging to the public system information is updated) or at least one piece of indication information corresponding to the public system information (the at least one piece of indication information is configured to indicate, in a one-to-one correspondence manner, that at least one piece of system information belonging to the public system information is updated). For the private system information, the terminal monitors, merely on a transmission resource corresponding to an own required system information group, an indication message of the required system information group, or the terminal addresses a physical control channel merely using an RNTI corresponding to the own required system information group.

In the above, several implementation manners for the terminal to acquire the at least one piece of indication information are described. At least one piece of target system information in the at least one system information group is determined merely according to the at least one piece of indication information. Although blind update can be avoided and the update efficiency is improved, repeated update may occur. In order to further avoid unnecessary update, the method 100 further includes the following operations.

The terminal acquires at least one tag value group sent by the network side device, the at least one tag value group being in one-to-one correspondence with the at least one system information group, each of the at least one tag value group including at least one tag value, and at least one tag value included in each of the at least one tag value group being in one-to-one correspondence with at least one piece of system information included in the corresponding system information group, wherein the operation that the terminal determines at least one piece of updated target system information in the at least one system information group includes that: the terminal compares a tag value corresponding to each piece of system information in the at least one system information group sent by the network side device with a tag value of the corresponding system information stored by the terminal, and determines at least one piece of updated target system information in each system information group.

In an alternative embodiment, each system information group corresponds to one tag value group. It is assumed that each system information group includes one piece of system information. The terminal may compare a tag value of each system information (group) in the at least one piece of system information (at least one system information group) with a tag value (group) of the corresponding system information (group), and determine that system information with different tag values is the system information which is updated. Table 3 is a possible manner of carrying a tag value in a tag value message.

TABLE 3

| System information type | Tag value | Meaning |
| --- | --- | --- |
| SIBx (SIx) | 00000-11111 | When an acquired tag value is different from a stored tag value, it is represented that SIBx (SIx) is updated, and otherwise, it is considered that no update occurs |

As shown in Table 3, the SIBx (SIx) is configured to indicate a certain system information. When the tag value of the SIBx acquired by the terminal is different from the stored (or last acquired) tag value of the SIBx, the SIB is considered to be updated, and the terminal may acquire the updated SIBx. In other words, when the tag value of the SIBx acquired by the terminal at the first time is different from the tag value of the SIBx acquired at the second time, the SIBx is considered to be updated, wherein the second time is earlier than the first time.

It is to be noted that the at least one piece of updated target system information in the embodiment of the present disclosure may include all pieces of system information which is updated, and may also include updated system information related to the terminal service requirement.

For example, each system information group includes one type of system information. It is assumed that at least one piece of indication information includes public indication information for indicating that the public system information is updated, the terminal may determine that the at least one piece of updated target system information includes all pieces of public system information, so that the terminal acquires all pieces of the updated public system information; or the terminal may read a tag value corresponding to each piece of system information belonging to the public system information (the public system information corresponds to multiple SIBs, and a tag value of each of the multiple SIBs is read), so as to further determine that at least one piece of updated target system information in the at least one system information group includes which system information in the public system information, thereby acquiring the at least one piece of updated target system information.

It is assumed that at least one piece of indication information includes private indication information for indicating that the private system information is updated, the terminal may determine that the at least one piece of updated target system information includes all pieces of private system information, so that the terminal acquires all pieces of the updated private system information; or the terminal may read a tag value corresponding to each piece of system information belonging to the private system information (the private system information corresponds to multiple SIBs, and a tag value of each of the multiple SIBs is read), so as to further determine that at least one piece of updated target system information in the at least one system information group includes which system information in the private system information, thereby acquiring the at least one piece of updated target system information.

In an alternative embodiment, as an example, the at least one system information group includes multiple system information groups, the at least one tag value group includes multiple tag value groups in one-to-one correspondence with the multiple system information groups, and the operation that the terminal acquires at least one tag value group sent by the network side device may include that: the terminal acquires the multiple tag value groups from one tag value message; or, the terminal acquires multiple tag value messages in one-to-one correspondence with the multiple system information groups, wherein each of the multiple tag value messages is configured to carry a tag value group corresponding to the corresponding system information group.

At least one tag value group may be carried in one tag value message, or may be carried in different tag value messages. The at least one tag value group is flexible in carrying mode, so that the terminal may acquire the required tag value group according to own needs of the terminal.

In an alternative embodiment, as an example, the operation that the terminal acquires multiple tag value messages in one-to-one correspondence with the multiple system information groups may include that: the terminal acquires a tag value message corresponding to each of the multiple system information groups from a second transmission resource for transmitting a tag value message corresponding to each of the multiple system information groups, wherein tag value messages of (corresponding to) different system information groups correspond to different second transmission resources; or, the terminal acquires a tag value message corresponding to each of the multiple system information groups according to a second network temporary identity corresponding to the tag value message corresponding to each of the multiple system information groups, wherein tag value messages of (corresponding to) different system information groups correspond to different second network temporary identities.

The manner in which the terminal acquires the tag value message is similar to the manner in which the terminal acquires the indication message. For brevity, it is not described herein.

In an alternative embodiment, as an example, the terminal receives a second configuration message, the second configuration message including a corresponding relationship between a tag value message corresponding to a system information group and a second transmission resource, or, the second configuration message including a corresponding relationship between a tag value message corresponding to a system information group and a second network temporary identity.

It is to be noted that the indication message and the tag value message may include a high layer signaling message (e.g., paging message) or a physical control channel message, wherein the first configuration message and the second configuration message may include a high layer signaling message (e.g., SIB message or MIB message).

In the above, a method for updating system information is described in detail, where different indication information is configured to indicate that different system information groups are updated in the method 100. The following describes a method for updating system information according to another embodiment of the present disclosure.

FIG. 2 is a schematic flowchart of a method 200 for updating system information according to another embodiment of the present disclosure. As shown in FIG. 2, the method 200 may include the following operations.

At S210, a terminal determines at least one system information group, the at least one system information group including at least one piece of system information.

At S220, the terminal acquires at least one tag value group by monitoring at least one tag value message in one-to-one correspondence with the at least one system information group sent by the network side device, wherein the at least one tag value group is in one-to-one correspondence with the at least one system information group, each of the at least one tag value group includes at least one tag value, and at least one tag value included in each tag value group is in one-to-one correspondence with at least one piece of system information included in the corresponding system information group.

At S230, the terminal determines, by comparing a tag value corresponding to each piece of system information in the at least one system information group sent by the network side device with a tag value of the corresponding system information stored by the terminal, at least one piece of updated target system information in the at least one system information group.

At S240, the terminal acquires the at least one piece of updated target system information.

In an alternative embodiment, the terminal may determine at least one system information group, and the description of the system information group may refer to the related description of the system information group described above. The terminal may monitor the tag value group corresponding to the system information group needed to be used. Therefore, the terminal may accurately determine, according to the tag value group of the system information required by the terminal, whether the system information group required by the terminal is updated. Further, monitoring merely the tag value group of the own required system information group, the burden on the terminal can be reduced and resource utilization is improved. For example, the terminal determines that a system information group A is a system message to be used by the terminal, and the terminal may monitor the tag value group of the system information group A, so that the terminal can update the system information group A in time.

In an alternative embodiment, as an example, the terminal may determine the at least one system information group according to a service requirement.

In an alternative embodiment, the operation that the terminal acquires at least one tag value group by monitoring at least one tag value message in one-to-one correspondence with the at least one system information group sent by the network side device includes the following operations.

The terminal acquires the at least one tag value group by monitoring a corresponding tag value message on a second transmission resource for transmitting a tag value message corresponding to each of the at least one system information group, wherein tag value messages corresponding to different system information groups correspond to different second transmission resources; or the terminal acquires the at least one tag value group by monitoring a corresponding tag value message through a second network temporary identity corresponding to a tag message corresponding to each of the at least one system information group, wherein tag value messages corresponding to different system information groups correspond to different second network temporary identities.

In an alternative embodiment, the terminal may monitor a related message (for example, a tag value message carrying the tag value corresponding to the system information group) of the required system information group on the second transmission resource corresponding to the own required system information group, so that the terminal can acquire the corresponding tag value in time.

In an alternative embodiment, as an example, the tag value message may include a paging message or a physical control channel message.

The terminal can monitor a tag value message corresponding to an own required system information group, so that the terminal can update the own required system information group in time.

It is to be noted that the related descriptions of the system information group, the tag value message, the second transmission resource, and the like in the method 200 may be referred to the related description in the method 100 above. For brevity, details are not described herein again.

The method for updating system information according to the embodiment of the present disclosure is described in detail above from the perspective of the terminal with reference to FIG. 1 to FIG. 2. The method for updating system information according to the embodiment of the present disclosure is described below from the perspective of a network side device.

FIG. 3 is a schematic flowchart of a method for updating system information according to yet another embodiment of the present disclosure. As shown in FIG. 3, the method 300 includes the following operations.

At S310, a network side device determines at least one piece of indication information, the at least one piece of indication information being configured to indicate that at least one system information group is updated, the at least one system information group being in one-to-one correspondence with the at least one piece of indication information, each system information group of the at least one system information group including at least one piece of system information.

At S320, the network side device sends the at least one piece of indication information.

In an alternative embodiment, the network side device may determine at least one piece of system information corresponding to the at least one system information group. The network side device may send the at least one piece of indication information by means of a broadcast, so that after receiving the at least one piece of indication information, the terminal can determine which system information groups are updated.

In an alternative embodiment, as an example, the at least one system information group includes a first system information group, at least one piece of system information included in the first system information group belongs to public system information, and the at least one piece of indication information includes first indication information for indicating whether the first system information group is updated; and/or, the at least one system information group includes a second system information group, at least one piece of system information included in the second system information group belongs to private system information, and the at least one piece of indication information includes second indication information for indicating whether the second system information group is updated.

In an alternative embodiment, as an example, the operation that the network side device sends the at least one piece of indication information may include the following operations.

The network side device sends the at least one piece of indication information through one indication message, wherein the one indication message includes at least two indication domains in one-to-one correspondence with at least two system information groups, each of the at least two indication domains is configured to carry information indicating whether the corresponding system information group is updated, the at least two indication domains include at least one indication domain, the at least one indication domain carries the at least one piece of indication information in a one-to-one correspondence manner, and the at least two system information groups include the at least one system information group.

In an alternative embodiment, as an example, the operation that the network side device sends the at least one piece of indication information may include the following operations.

The network side device sends at least two indication messages in one-to-one correspondence with at least two system information groups, wherein each of the at least two indication messages is configured to carry information indicating whether the corresponding system information group is updated, the at least two indication messages include at least one indication message, the at least one indication message carries the at least one piece of indication information in a one-to-one correspondence manner, and the at least two system information groups include the at least one system information group.

In an alternative embodiment, as an example, the operation that the network side device sends at least two indication messages in one-to-one correspondence with the at least two system information groups may include that: the network side device sends an indication message corresponding to each of the at least two system information groups on a first transmission resource for transmitting an indication message corresponding to each of the at least two system information groups, wherein indication messages corresponding to different system information groups correspond to different first transmission resources; or, the network side device sends an indication message corresponding to each of the at least two system information groups according to a first network temporary identity corresponding to the indication message corresponding to each of the at least two system information groups, wherein indication messages corresponding to different system information groups correspond to different first network temporary identities.

In an alternative embodiment, as an example, the method further includes that: the terminal sends a first configuration message, the first configuration message including a corresponding relationship between an indication message of (corresponding to) a system information group and a first transmission resource, or, the first configuration message including a corresponding relationship between an indication message corresponding to a system information group and a first network temporary identity.

In an alternative embodiment, as an example, the method further includes that: the network side device sends at least one tag value group, the at least one tag value group being in one-to-one correspondence with the at least one system information group, each of the at least one tag value group including at least one tag value, and at least one tag value included in each tag value group being in one-to-one correspondence with at least one piece of system information included in the corresponding system information group.

In an alternative embodiment, as an example, the at least one system information group includes multiple system information groups, and the at least one tag value group includes multiple tag value groups in one-to-one correspondence with the multiple system information groups.

The operation that the network side device sends at least one tag value group includes that: the network side device sends one tag value message carrying the multiple tag value groups; or, the network side device sends multiple tag value messages in one-to-one correspondence with the multiple system information groups, wherein each of the multiple tag value messages is configured to carry a tag value group corresponding to the corresponding system information group.

In an alternative embodiment, as an example, the operation that the network side device sends multiple tag value messages in one-to-one correspondence with the multiple system information groups includes that: the network side device sends a tag value message corresponding to each of the multiple system information groups on a second transmission resource for transmitting a tag value message corresponding to each of the multiple system information groups, wherein tag value messages corresponding to different system information groups correspond to different second transmission resources; or, the network side device sends a tag value message corresponding to each of the multiple system information groups according to a second network temporary identity corresponding to the tag value message corresponding to each of the multiple system information groups, wherein tag value messages corresponding to different system information groups correspond to different second network temporary identities.

In an alternative embodiment, as an example, the method further includes that: the network side device sends a second configuration message, the second configuration message including a corresponding relationship between a tag value message corresponding to a system information group and a second transmission resource, or, the second configuration message including a corresponding relationship between a tag value message corresponding to a system information group and a second network temporary identity.

In this solution, at least one piece of indication information is in one-to-one correspondence with at least one system information group. The indication information may indicate that one piece of system information is updated, may also indicate that one type of system information is updated, and may also indicate that multiple pieces of system information divided according to a certain manner are updated. The indication of the indication information can reduce the update range of updating the system information by a terminal, thereby improving update efficiency.

It is to be noted that the network side device in the method 300 may correspond to the network side device in the foregoing method 100. The related descriptions of the system information group, the indication message, the indication domain, the tag value message, and the like in the method 300 may refer to the related descriptions in the method 100. For the sake of brevity, the present disclosure will not be described herein.

FIG. 4 is a schematic flowchart of a method for updating system information according to another embodiment of the present disclosure. As shown in FIG. 4, the method 400 includes the following operations.

At S410, a network side device determines at least one system information group which is updated, each of the at least one system information group including at least one piece of system information.

At S420, the network side device sends at least one tag value message in one-to-one correspondence with the at least one system information group, wherein the at least one tag value group is in one-to-one correspondence with the at least one system information group, each of the at least one tag value group includes at least one tag value, and at least one tag value included in each tag value group is in one-to-one correspondence with at least one piece of system information included in the corresponding system information group.

The network side device sends the tag value message corresponding to the updated system information group to the terminal, so that the terminal can monitor the tag value message of the system information group required by the terminal, thereby improving the update efficiency.

In an alternative embodiment, as an example, the tag value message includes a paging message or a physical control channel message.

In an alternative embodiment, as an example, the network side device can determine, according to a service requirement, the at least one system information group which is updated.

In an alternative embodiment, as an example, the at least one piece of system information includes at least two pieces of system information, and the operation that the network side device sends at least one tag value message in one-to-one correspondence with the at least one piece of system information group includes that: the network side device sends a tag value message corresponding to each of the at least two system information groups on a second transmission resource for transmitting a tag value message corresponding to each of the at least two pieces of system information, wherein tag value messages corresponding to different system information groups correspond to different second transmission resources; or, the network side device sends a tag value message corresponding to each of the at least two system information groups according to a second network temporary identity corresponding to the tag value message corresponding to each of the at least two pieces of system information, wherein tag value messages corresponding to different system information groups correspond to different second network temporary identities.

It is to be noted that the network side device in the method 400 may correspond to the network side device in the foregoing method 200. The related descriptions of the system information group, the tag value message, the tag value group and the like in the method 400 may refer to the related descriptions in the method 200 or the method 100. For the sake of brevity, the present disclosure will not be described herein.

The method for updating system information according to the embodiment of the present disclosure is described in detail above with reference to FIG. 1 to FIG. 4. The terminal according to the embodiment of the present disclosure is described in detail below with reference to FIG. 5 and FIG. 6. FIG. 5 is a schematic block diagram of a terminal 500 according to an embodiment of the present disclosure. As shown in FIG. 5, a terminal 500 is provided. The terminal 500 includes an acquiring component 510 and a determining component 520.

The acquiring component 510 is configured to acquire at least one piece of indication information sent by a network side device, the at least one piece of indication information being configured to indicate that at least one system information group is updated, the at least one system information group being in one-to-one correspondence with the at least one piece of indication information, and each of the at least one system information group including at least one piece of system information.

The determining component 520 is configured to determine at least one piece of updated target system information in the at least one system information group. The acquiring component 510 is further configured to acquire the at least one piece of updated target system information.

In this solution, at least one piece of indication information is in one-to-one correspondence with at least one system information group. The indication information may indicate that one piece of system information is updated, may also indicate that one type of system information is updated, and may also indicate that multiple pieces of system information divided according to a certain manner are updated. The indication of the indication information can reduce the update range of updating the system information by a terminal, thereby improving update efficiency and shortening update delay.

In an alternative embodiment, as an example, the at least one system information group includes a first system information group, at least one piece of system information included in the first system information group belongs to public system information, and the at least one piece of indication information includes first indication information for indicating that the first system information group is updated; and/or, the at least one system information group includes a second system information group, at least one piece of system information included in the second system information group belongs to private system information, and the at least one piece of indication information includes second indication information for indicating that the second system information group is updated.

In an alternative embodiment, as an example, the acquiring component 510 is configured to: determine at least one indication domain from at least two indication domains which are in one-to-one correspondence with at least two system information groups and are included in one indication message, wherein each of the at least two indication domains is configured to carry information indicating whether the corresponding system information group is updated, each of the at least one indication domain currently carries information indicating that the corresponding system information group is updated, and the at least two system information groups include the at least one system information group; and acquire the at least one piece of indication information from the at least one indication domain.

In an alternative embodiment, as an example, the acquiring component 510 is configured to: acquire at least two indication messages in one-to-one correspondence with the at least two system information groups, wherein each of the at least two indication messages is configured to carry information indicating whether the corresponding system information group is updated, and the at least two system information groups include the at least one system information group; determine at least one indication message from the at least two indication messages, each of the at least one indication message currently carrying information indicating that the corresponding system information group is updated; and acquire the at least one piece of indication information from the at least one indication message.

In an alternative embodiment, as an example, the acquiring component 510 is configured to: acquire an indication message corresponding to each of the at least two system information groups on a first transmission resource for transmitting an indication message corresponding to each of the at least two system information groups, wherein indication messages corresponding to different system information groups correspond to different first transmission resources; or, acquire an indication message corresponding to each of the at least two system information groups according to a first network temporary identity corresponding to the indication message corresponding to each corresponding to the at least two system information groups, wherein indication messages corresponding to different system information groups correspond to different first network temporary identities.

In an alternative embodiment, as an example, the acquiring component 510 is further configured to: acquire a first configuration message, the first configuration message including a corresponding relationship between an indication message corresponding to a system information group and a first transmission resource, or, the first configuration message including a corresponding relationship between an indication message corresponding to a system information group and a first network temporary identity.

In an alternative embodiment, as an example, the acquiring component 510 is further configured to: acquire at least one tag value group sent by the network side device, the at least one tag value group being in one-to-one correspondence with the at least one system information group, each of the at least one tag value group including at least one tag value, and at least one tag value included in each of the at least one tag value group being in one-to-one correspondence with at least one piece of system information included in the corresponding system information group; and the determining component 520 is configured to: compare a tag value corresponding to each piece of system information in the at least one system information group sent by the network side device with a tag value of the corresponding system information stored by the terminal 500, and determines at least one piece of updated target system information in the at least one system information group.

In an alternative embodiment, as an example, the at least one system information group includes multiple system information groups, the at least one tag value group includes multiple tag value groups in one-to-one correspondence with the multiple system information groups, and the acquiring component 510 is configured to: acquire the multiple tag value groups from one tag value message; or, acquire multiple tag value messages in one-to-one correspondence with the multiple system information groups, wherein each of the multiple tag value messages is configured to carry a tag value group corresponding to the corresponding system information group.

In an alternative embodiment, as an example, the acquiring component 510 is configured to: acquire a tag value message corresponding to each of the multiple system information groups on a second transmission resource for transmitting a tag value message corresponding to each of the multiple system information groups, wherein tag value messages corresponding to different system information groups correspond to different second transmission resources; or, the terminal 500 acquires a tag value message corresponding to each of the multiple system information groups according to a second network temporary identity corresponding to the tag value message corresponding to each of the multiple system information groups, wherein tag value messages corresponding to different system information groups correspond to different second network temporary identities.

In an alternative embodiment, as an example, the acquiring component 510 is further configured to: receive a second configuration message sent by the network side device, the second configuration message including a corresponding relationship between a tag value message corresponding to a system information group and a second transmission resource, or, the second configuration message including a corresponding relationship between a tag value message corresponding to a system information group and a second network temporary identity.

In an alternative embodiment, as an example, the acquiring component 510 is configured to: determine the at least one system information group; and monitor indication information corresponding to each of the at least one system information group.

Therefore, different system information groups are indicated by different indication information, so that the terminal can acquire corresponding indication information and/or tag value group according to an own requirement (service requirement), thereby updating an own required system information group in time.

It is to be noted that the terminal 500 may respond to a terminal in the data transmission of the method 100 according to an embodiment of the present disclosure, and each component in the terminal 500 and the other operations or functions described above are respectively intended to implement the corresponding processes performed by the terminal in various embodiments as shown in FIG. 1, and details are not described herein again for brevity.

FIG. 6 is a schematic block diagram of a terminal 600 according to another embodiment of the present disclosure. As shown in FIG. 6, a terminal 600 is provided. The terminal 600 includes a determining component 610 and an acquiring component 620.

The determining component 610 is configured to determine at least one system information group, each of the at least one system information group including at least one piece of system information.

The acquiring component 620 is configured to acquire at least one tag value group by monitoring at least one tag value message in one-to-one correspondence with the at least one system information group sent by the network side device, wherein the at least one system information group is in one-to-one correspondence with the at least one tag value group, each of the at least one tag value group includes at least one tag value, and at least one tag value included in each tag value group is in one-to-one correspondence with at least one piece of system information included in the corresponding system information group.

The determining component 610 is further configured to determine, by comparing a tag value corresponding to each piece of system information in the at least one system information group sent by the network side device with a tag value of the corresponding system information stored by the terminal, at least one piece of updated target system information in the at least one system information group.

The acquiring component 620 is further configured to acquire the at least one piece of updated target system information.

The terminal may monitor a tag value message corresponding to an own system information group, so as to timely determine whether the own required system information group is updated according to a tag value group carried in the tag value message, so that the update efficiency of system information can be improved, and the update delay can be shortened.

In an alternative embodiment, as an example, the acquiring component 620 is configured to: acquire the at least one tag value by monitoring a corresponding tag value message on a second transmission resource for transmitting a tag value message corresponding to each of the at least one system information group, wherein tag value messages corresponding to different system information groups correspond to different second transmission resources; or acquire the at least one tag value by monitoring a corresponding tag value message through a second network temporary identity corresponding to a tag message corresponding to each of the at least one system information group, wherein tag value messages corresponding to different system information group correspond to different second network temporary identities.

In an alternative embodiment, as an example, the tag value message includes a paging message or a physical control channel message.

The terminal can monitor a tag value group corresponding to an own required system information group in many manners, so that the terminal can update the corresponding system information group in time.

It is also to be noted that the terminal 600 may respond to a terminal in the data transmission of the method 200 according to an embodiment of the present disclosure, and each component in the terminal 600 and the other operations or functions described above are respectively intended to implement the corresponding processes performed by the terminal in various embodiments as shown in FIG. 2, and details are not described herein again for brevity.

Figure 7:
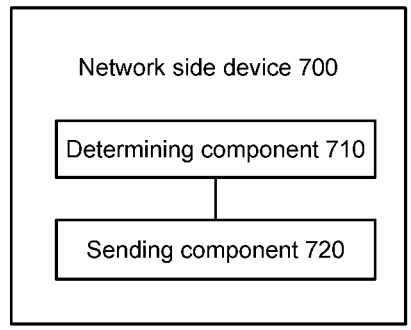
FIG. 7 is a schematic block diagram of a network side device according to an embodiment of the present disclosure.

FIG. 7 is a schematic block diagram of a network side device 700 according to an embodiment of the present disclosure. As shown in FIG. 7, a network side device 700 is provided. The network side device 700 may include a determining component 710 and a sending component 720.

The determining component 710 is configured to determine at least one piece of indication information, the at least one piece of indication information being configured to indicate that at least one system information group is updated, the at least one system information group being in one-to-one correspondence with the at least one piece of indication information, and each system information group of the at least one system information group including at least one piece of system information.

The sending component 720 is configured to send the at least one piece of indication information.

In an alternative embodiment, as an example, the at least one system information group includes a first system information group, at least one piece of system information included in the first system information group belongs to public system information, and the at least one piece of indication information includes first indication information for indicating whether the first system information group is updated; and/or, the at least one system information group includes a second system information group, at least one piece of system information included in the second system information group belongs to private system information, and the at least one piece of indication information includes second indication information for indicating whether the second system information group is updated.

In an alternative embodiment, as an example, the sending component 720 is configured to: send the at least one piece of indication information through one indication message, wherein the one indication message includes at least two indication domains in one-to-one correspondence with at least two system information groups, each of the at least two indication domains is configured to carry information indicating whether the corresponding system information group is updated, the at least two indication domains include at least one indication domain, the at least one indication domain carries the at least one piece of indication information in a one-to-one correspondence manner, and the at least two system information groups include the at least one system information group.

In an alternative embodiment, as an example, the sending component 720 is configured to: send at least two indication messages in one-to-one correspondence with at least two system information groups, wherein each of the at least two indication messages is configured to carry information indicating whether the corresponding system information group is updated, the at least two indication messages include at least one indication message, the at least one indication message carries the at least one piece of indication information in a one-to-one correspondence manner, and the at least two system information groups include the at least one system information group.

In an alternative embodiment, as an example, the sending component 720 is configured to: send an indication message corresponding to each of the at least two system information groups on a first transmission resource for transmitting an indication message corresponding to each of the at least two system information groups, wherein indication messages corresponding to different system information groups correspond to different first transmission resources; or, send an indication message corresponding to each of the at least two system information groups according to a first network temporary identity corresponding to the indication message corresponding to each of the at least two system information groups, wherein indication messages corresponding to different system information groups correspond to different first network temporary identities.

In an alternative embodiment, as an example, the sending component 720 is further configured to: send a first configuration message, the first configuration message including a corresponding relationship between an indication message corresponding to a system information group and a first transmission resource, or, the first configuration message including a corresponding relationship between an indication message corresponding to a system information group and a first network temporary identity.

In an alternative embodiment, as an example, the sending component 720 is further configured to: send at least one tag value group, the at least one tag value group being in one-to-one correspondence with the at least one system information group, each of the at least one tag value group including at least one tag value, and at least one tag value included in each tag value group being in one-to-one correspondence with at least one piece of system information included in the corresponding system information group.

In an alternative embodiment, as an example, the at least one system information group includes multiple system information groups, and the at least one tag value group includes multiple tag value groups in one-to-one correspondence with the multiple system information groups.

The sending component 720 is configured to: send one tag value message carrying the multiple tag value groups; or, send multiple tag value messages in one-to-one correspondence with the multiple system information groups, wherein each of the multiple tag value messages is configured to carry a tag value group corresponding to the corresponding system information group.

In an alternative embodiment, as an example, the sending component 720 is configured to: send a tag value message corresponding to each of the multiple system information groups on a second transmission resource for transmitting a tag value message corresponding to each of the multiple system information groups, wherein tag value messages corresponding to different system information groups correspond to different second transmission resources; or send a tag value message corresponding to each of the multiple system information groups according to a second network temporary identity corresponding to the tag value message corresponding to each of the multiple system information groups, wherein tag value messages corresponding to different system information groups correspond to different second network temporary identities.

In an alternative embodiment, as an example, the sending component 720 is further configured to: send a second configuration message, the second configuration message including a corresponding relationship between a tag value message corresponding to a system information group and a second transmission resource, or, the second configuration message including a corresponding relationship between a tag value message corresponding to a system information group and a second network temporary identity.

It is to be noted that the network side device 700 may respond to a network side device in the data transmission of the method 100 and method 300 according to an embodiment of the present disclosure, and each component in the network side device 700 and the other operations or functions described above are respectively intended to implement the corresponding processes performed by the network side device in various embodiments as shown in FIG. 3, and details are not described herein again for brevity.

Figure 8:
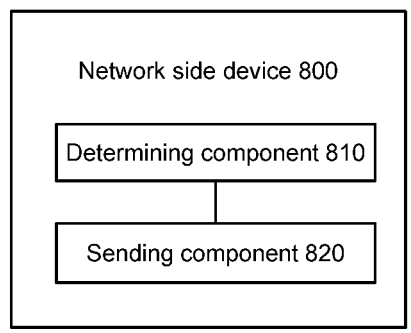
FIG. 8 is a schematic block diagram of a network side device according to another embodiment of the present disclosure.

FIG. 8 is a schematic block diagram of a network side device 800 according to another embodiment of the present disclosure. As shown in FIG. 8, a network side device 800 is provided. The network side device 800 may include a determining component 810 and a sending component 820.

The determining component 810 is configured to determine at least one system information group which is updated, each of the at least one system information group including at least one piece of system information.

The sending component 820 is configured to send at least one tag value message in one-to-one correspondence with the at least one system information group, wherein the at least one tag value group is in one-to-one correspondence with the at least one system information group, each of the at least one tag value group includes at least one tag value, and at least one tag value included in each tag value group is in one-to-one correspondence with at least one piece of system information included in the corresponding system information group.

In an alternative embodiment, as an example, the tag value message includes a paging message or a physical control channel message.

In an alternative embodiment, as an example, the at least one piece of system information includes at least two pieces of system information, and the sending component 820 is configured to:

send a tag value message corresponding to each of the at least two system information groups on a second transmission resource for transmitting a tag value message corresponding to each of the at least two pieces of system information, wherein tag value messages corresponding to different system information groups correspond to different second transmission resources; or send a tag value message corresponding to each of the at least two system information groups to the terminal according to a second network temporary identity corresponding to the tag value message corresponding to each of the at least two pieces of system information, wherein tag value messages corresponding to different system information groups correspond to different second network temporary identities.

It is also to be noted that the network side device 800 may respond to a network side device in the data transmission of the method 200 and method 400 according to an embodiment of the present disclosure, and each component in the network side device 800 and the other operations or functions described above are respectively intended to implement the corresponding processes performed by the network side device in various embodiments as shown in FIG. 4, and details are not described herein again for brevity.

Figure 9:
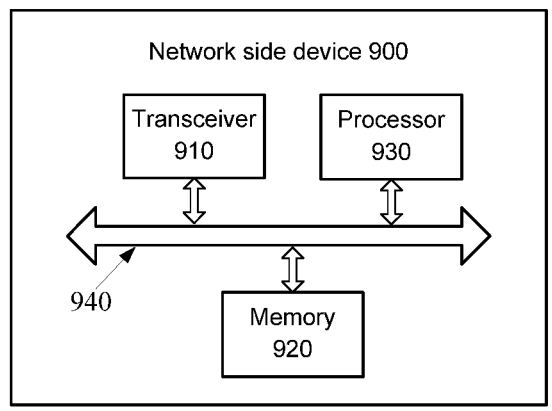
FIG. 9 is a schematic block diagram of a terminal according to yet another embodiment of the present disclosure.

FIG. 9 is a schematic block diagram of a terminal 900 according to another embodiment of the present disclosure. As shown in FIG. 9, the terminal 900 includes: a transceiver 910, a memory 920, a processor 930, and a bus system 940. The transceiver 910, the memory 920 and the processor 930 are connected through the bus system 940, the memory 920 is configured to store an instruction, the processor 930 is configured to execute the instruction stored in the memory 920 to control the transceiver 910 to transmit and send a signal, and the processor 930 is configured to:

acquire, through the transceiver 910, at least one piece of indication information sent by a network side device, the at least one piece of indication information being configured to indicate that at least one system information group is updated, the at least one system information group being in one-to-one correspondence with the at least one piece of indication information, and each of the at least one system information group including at least one piece of system information; determine at least one piece of updated target system information in the at least one system information group; and acquire the at least one piece of updated target system information.

In an alternative embodiment, as an example, the at least one system information group includes a first system information group, at least one piece of system information included in the first system information group belongs to public system information, and the at least one piece of indication information includes first indication information for indicating that the first system information group is updated; and/or, the at least one system information group includes a second system information group, at least one piece of system information included in the second system information group belongs to private system information, and the at least one piece of indication information includes second indication information for indicating that the second system information group is updated.

In an alternative embodiment, as an example, the processor 930 is configured to: determine, through the transceiver 910, at least one indication domain from at least two indication domains which are in one-to-one correspondence with at least two system information groups and are included in one indication message, wherein each of the at least two indication domains is configured to carry information indicating whether the corresponding system information group is updated, each of the at least one indication domain currently carries information indicating that the corresponding system information group is updated, and the at least two system information groups include the at least one system information group; and acquire the at least one piece of indication information from the at least one indication domain.

In an alternative embodiment, as an example, the processor 930 is configured to: acquire, through the transceiver 910, at least two indication messages in one-to-one correspondence with the at least two system information groups, wherein each of the at least two indication messages is configured to carry information indicating whether the corresponding system information group is updated, and the at least two system information groups include the at least one system information group; determine at least one indication message from the at least two indication messages, each of the at least one indication message currently carrying information indicating that the corresponding system information group is updated; and acquire the at least one piece of indication information from the at least one indication message.

In an alternative embodiment, as an example, the processor 930 is configured to: acquire, through the transceiver 910, an indication message corresponding to each of the at least two system information groups on a first transmission resource for transmitting an indication message corresponding to each of the at least two system information groups, wherein indication messages corresponding to different system information groups correspond to different first transmission resources; or, acquire an indication message corresponding to each of the at least two system information groups according to a first network temporary identity corresponding to the indication message corresponding to each of the at least two system information groups, wherein indication messages corresponding to different system information groups correspond to different first network temporary identities.

In an alternative embodiment, as an example, the processor 930 is further configured to: acquire, through the transceiver 910, a first configuration message, the first configuration message including a corresponding relationship between an indication message corresponding to a system information group and a first transmission resource, or, the first configuration message including a corresponding relationship between an indication message corresponding to a system information group and a first network temporary identity.

In an alternative embodiment, as an example, the processor 930 is further configured to: acquire, through the transceiver 910, at least one tag value group sent by the network side device, the at least one tag value group being in one-to-one correspondence with the at least one system information group, each of the at least one tag value group including at least one tag value, and at least one tag value included in each of the at least one tag value group being in one-to-one correspondence with at least one piece of system information included in the corresponding system information group; and compare a tag value corresponding to each piece of system information in the at least one system information group sent by the network side device with a tag value of the corresponding system information stored by the terminal 900, and determines at least one piece of updated target system information in the at least one system information group.

In an alternative embodiment, as an example, the at least one system information group includes multiple system information groups, the at least one tag value group includes multiple tag value groups in one-to-one correspondence with the multiple system information groups, and the processor 930 is further configured to: acquire, through the transceiver 910, the multiple tag value groups from one tag value message; or, acquire multiple tag value messages in one-to-one correspondence with the multiple system information groups, wherein each of the multiple tag value messages is configured to carry a tag value group corresponding to the corresponding system information group.

In an alternative embodiment, as an example, the processor 930 is configured to: acquire, through the transceiver 910, a tag value message corresponding to each of the multiple system information groups on a second transmission resource for transmitting a tag value message corresponding to each of the multiple system information groups, wherein tag value messages corresponding to different system information groups correspond to different second transmission resources; or, the terminal 900 acquires a tag value message corresponding to each of the multiple system information groups according to a second network temporary identity corresponding to the tag value message corresponding to each of the multiple system information groups, wherein tag value messages corresponding to different system information groups correspond to different second network temporary identities.

In an alternative embodiment, as an example, the processor 930 is further configured to: receive, through the transceiver 910, a second configuration message sent by the network side device, the second configuration message including a corresponding relationship between a tag value message corresponding to a system information group and a second transmission resource, or, the second configuration message including a corresponding relationship between a tag value message corresponding to a system information group and a second network temporary identity.

In an alternative embodiment, as an example, the processor 930 is configured to: determine the at least one system information group; and monitor indication information corresponding to each of the at least one system information group.

In an alternative embodiment, as an example, the processor 930 is configured to determine the at least one system information group according to a service requirement.

It is to be noted that the terminal 900 may respond to a terminal in the data transmission of the method 100 according to an embodiment of the present disclosure, and each component in the terminal 900 and the other operations or functions described above are respectively intended to implement the corresponding processes performed by the network side device in various embodiments as shown in FIG. 1, and details are not described herein again for brevity.

It is to be understood that in the embodiment of the present disclosure, the processor 930 may be a general-purpose Central Processing Unit (CPU), a microprocessor 930, an Application Specific Integrated Circuit (ASIC), or one or more integrated circuits configured to execute the related program to implement the technical solution provided by the embodiment of the present disclosure.

The transceiver 910 can realize communication between a mobile terminal and other devices or communication networks.

The memory 920 may include a Read-Only Memory (ROM) and a Random Access Memory (RAM) and provides instructions and data to the processor 930. A portion of the memory 930 may also include a non-volatile RAM. For example, the memory 930 may also store information of a device type.

The bus system 940 may further include, in addition to a data bus, a power bus, a control bus, a status signal bus or the like. However, for clarity of description, various buses are labeled as the bus system 940 in the figure. In the implementation process, each step of the above method may be completed by an integrated logic circuit of hardware or an instruction in the form of software. Various steps of the method disclosed in the embodiment of the present disclosure may be directly implemented as being completely performed by a hardware processor by using the method for updating system information disclosed in the embodiment of the present disclosure through the processor 930, or may be completely performed by a combination of hardware and software modules in the processor. The software module may be located in a mature storage medium such as a random access memory, a flash memory, a read only memory, a programmable read only memory or an electrically erasable programmable memory, and a register. The storage medium is located in the memory 920, and the processor 930 reads information in the memory 920 and completes the steps of the above method in combination with hardware thereof. To avoid repetition, no descriptions will be made herein.

Figure 10:
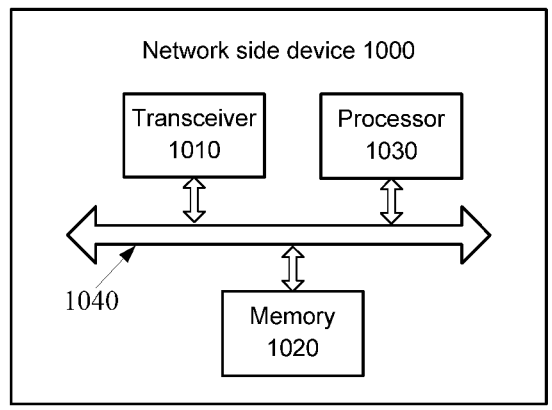
FIG. 10 is a schematic block diagram of a terminal according to a further embodiment of the present disclosure.

FIG. 10 is a schematic block diagram of a terminal 1000 according to a further embodiment of the present disclosure. As shown in FIG. 10, the terminal 1000 is provided. The terminal 1000 may include: a transceiver 1010, a memory 1020, a processor 1030, and a bus system 1040. The transceiver 1010, the memory 1020 and the processor 1030 are connected through the bus system 1040, the memory 1020 is configured to store an instruction, the processor 1030 is configured to execute the instruction stored in the memory 1020 to control the transceiver 1010 to transmit and send a signal, and the processor 1030 is configured to:

determine at least one system information group, each of the at least one system information group including at least one piece of system information; and acquire at least one tag value group by monitoring, through the transceiver 1010, at least one tag value message in one-to-one correspondence with the at least one system information group sent by the network side device, wherein the at least one system information group is in one-to-one correspondence with the at least one tag value group, each of the at least one tag value group includes at least one tag value, and at least one tag value included in each tag value group is in one-to-one correspondence with at least one piece of system information included in the corresponding system information group.

The processor 1030 is further configured to determine, by comparing a tag value corresponding to each piece of system information in the at least one system information group sent by the network side device with a tag value of the corresponding system information stored by the terminal, at least one piece of updated target system information in the at least one system information group.

The processor 1030 is further configured to acquire the at least one piece of updated target system information.

In an alternative embodiment, as an example, the processor 1030 is configured to determine the at least one system information group.

In an alternative embodiment, as an example, the processor 1030 is configured to: acquire, through the transceiver 1010, the at least one tag value group by monitoring a corresponding tag value message on a second transmission resource for transmitting a tag value message corresponding to each of the at least one system information group, wherein tag value messages corresponding to different system information groups correspond to different second transmission resources; or acquire the at least one tag value group by monitoring a corresponding tag value message through a second network temporary identity corresponding to a tag message corresponding to each of the at least one system information group, wherein tag value messages corresponding to different system information groups correspond to different second network temporary identities.

In an alternative embodiment, as an example, the tag value message includes a paging message or a physical control channel message.

It is to be noted that the terminal 1000 may respond to a terminal in the data transmission of the method 200 according to an embodiment of the present disclosure, and each component in the terminal 1000 and the other operations or functions described above are respectively intended to implement the corresponding processes performed by the terminal in various embodiments as shown in FIG. 2, and details are not described herein again for brevity.

It is to be understood that in the embodiment of the present disclosure, the processor 1030 may be a general-purpose CPU, a microprocessor, an ASIC, or one or more integrated circuits configured to execute the related program to implement the technical solution provided by the embodiment of the present disclosure.

The transceiver 1010 can realize communication between a mobile terminal and other devices or communication networks.

The memory 1020 may include a ROM and a RAM and provides instructions and data to the processor 1030. A portion of the processor 1030 may also include a non-volatile RAM. For example, the processor 1030 may also store information of a device type.

The bus system 1040 may further include, in addition to a data bus, a power bus, a control bus, a status signal bus or the like. However, for clarity of description, various buses are labeled as the bus system 1040 in the figure. In the implementation process, each step of the above method may be completed by an integrated logic circuit of hardware or an instruction in the form of software. Various steps of the method disclosed in the embodiment of the present disclosure may be directly implemented as being completely performed by a hardware processor by using the method for updating system information disclosed in the embodiment of the present disclosure through the processor 1030, or may be completely performed by a combination of hardware and software modules in the processor. The software module may be located in a mature storage medium such as a random access memory, a flash memory, a read only memory, a programmable read only memory or an electrically erasable programmable memory, and a register. The storage medium is located in the memory 1020, and the processor 1030 reads information in the memory 1020 and completes the steps of the above method in combination with hardware thereof. To avoid repetition, no descriptions will be made herein.

Figure 11:
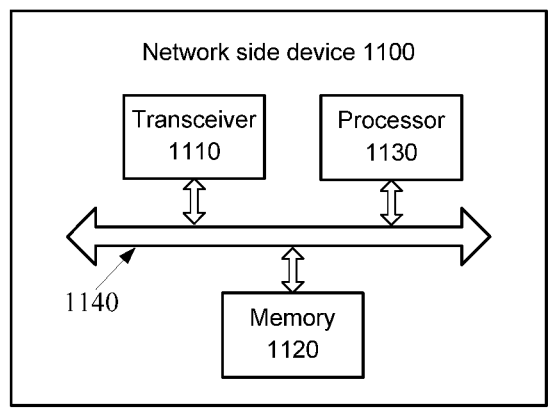
FIG. 11 is a schematic block diagram of a network side device according to yet another embodiment of the present disclosure.

FIG. 11 is a schematic block diagram of a network side device 1100 according to yet another embodiment of the present disclosure. As shown in FIG. 11, the network side device 1100 is provided. The network side device 1100 may include: a transceiver 1110, a memory 1120, a processor 1130, and a bus system 1140. The transceiver 1110, the memory 1120 and the processor 1130 are connected through the bus system 1140, the memory 1120 is configured to store an instruction, the processor 1130 is configured to execute the instruction stored in the memory 1120 to control the transceiver 1110 to transmit and send a signal, and the processor 1130 is configured to:

determine at least one piece of indication information, the at least one piece of indication information being configured to indicate that at least one system information group is updated, the at least one system information group being in one-to-one correspondence with the at least one piece of indication information, and each of the at least one system information group including at least one piece of system information.

The transceiver 1110 is configured to send the at least one piece of indication information.

In an alternative embodiment, as an example, the at least one system information group includes a first system information group, at least one piece of system information included in the first system information group belongs to public system information, and the at least one piece of indication information includes first indication information for indicating whether the first system information group is updated; and/or, the at least one system information group includes a second system information group, at least one piece of system information included in the second system information group belongs to private system information, and the at least one piece of indication information includes second indication information for indicating whether the second system information group is updated.

In an alternative embodiment, as an example, the transceiver 1110 is configured to: send the at least one piece of indication information through one indication message, wherein the one indication message includes at least two indication domains in one-to-one correspondence with at least two system information groups, each of the at least two indication domains is configured to carry information indicating whether the corresponding system information group is updated, the at least two indication domains include at least one indication domain, the at least one indication domain carries the at least one piece of indication information in a one-to-one correspondence manner, and the at least two system information groups include the at least one system information group.

In an alternative embodiment, as an example, the transceiver 1110 is In an alternative embodiment configured to: send at least two indication messages in one-to-one correspondence with at least two system information groups, wherein each of the at least two indication messages is configured to carry information indicating whether the corresponding system information group is updated, the at least two indication messages include at least one indication message, the at least one indication message carries at least one piece of first indication information in a one-to-one correspondence manner, and the at least two system information groups include the at least one system information group.

In an alternative embodiment, as an example, the transceiver 1110 is configured to: send an indication message corresponding to each of the at least two system information groups on a first transmission resource for transmitting an indication message corresponding to each of the at least two system information groups, wherein indication messages corresponding to different system information groups correspond to different first transmission resources; or, send an indication message corresponding to each of the at least two system information groups according to a first network temporary identity corresponding to the indication message corresponding to each of the at least two system information groups, wherein indication messages corresponding to different system information groups correspond to different first network temporary identities.

In an alternative embodiment, as an example, the transceiver 1110 is further configured to: send a first configuration message, the first configuration message including a corresponding relationship between an indication message corresponding to a system information group and a first transmission resource, or, the first configuration message including a corresponding relationship between an indication message corresponding to a system information group and a first network temporary identity.

In an alternative embodiment, as an example, the transceiver 1110 is further configured to: send at least one tag value group, the at least one tag value group being in one-to-one correspondence with the at least one system information group, each of the at least one tag value group including at least one tag value, and at least one tag value included in each tag value group being in one-to-one correspondence with at least one piece of system information included in the corresponding system information group.

In an alternative embodiment, as an example, the at least one system information group includes multiple system information groups, and the at least one tag value group includes multiple tag value groups in one-to-one correspondence with the multiple system information groups.

The transceiver 1110 is configured to: send one tag value message carrying the multiple tag value groups; or, send multiple tag value messages in one-to-one correspondence with the multiple system information groups, wherein each of the multiple tag value messages is configured to carry a tag value group corresponding to the corresponding system information group.

In an alternative embodiment, as an example, the transceiver 1110 is In an alternative embodiment configured to: send a tag value message corresponding to each of the multiple system information groups on a second transmission resource for transmitting a tag value message corresponding to each of the multiple system information groups, wherein tag value messages corresponding to different system information groups correspond to different second transmission resources; or send a tag value message corresponding to each of the multiple system information groups according to a second network temporary identity corresponding to the tag value message corresponding to each of the multiple system information groups, wherein tag value messages corresponding to different system information groups correspond to different second network temporary identities.

In an alternative embodiment, as an example, the transceiver 1110 is further configured to: send a second configuration message, the second configuration message including a corresponding relationship between a tag value message corresponding to a system information group and a second transmission resource, or, the second configuration message including a corresponding relationship between a tag value message corresponding to a system information group and a second network temporary identity.

It is to be noted that the network side device 1100 may respond to a network side device in the data transmission of the method 100 and method 300 according to an embodiment of the present disclosure, and each component in the network side device 1100 and the other operations or functions described above are respectively intended to implement the corresponding processes performed by the network side device in various embodiments as shown in FIG. 1 and FIG. 3, and details are not described herein again for brevity.

It is to be understood that in the embodiment of the present disclosure, the processor 1130 may be a general-purpose CPU, a microprocessor, an ASIC, or one or more integrated circuits configured to execute the related program to implement the technical solution provided by the embodiment of the present disclosure.

The transceiver 1110 can realize communication between a mobile terminal and other devices or communication networks.

The memory 1120 may include a ROM and a RAM and provides instructions and data to the processor 1130. A portion of the processor 1130 may also include a non-volatile RAM. For example, the processor 1130 may also store information of a device type.

The bus system 1140 may further include, in addition to a data bus, a power bus, a control bus, a status signal bus or the like. However, for clarity of description, various buses are labeled as the bus system 1140 in the figure. In the implementation process, each step of the above method may be completed by an integrated logic circuit of hardware or an instruction in the form of software. Various steps of the method disclosed in the embodiment of the present disclosure may be directly implemented as being completely performed by a hardware processor by using the method for updating system information disclosed in the embodiment of the present disclosure through the processor 1130, or may be completely performed by a combination of hardware and software modules in the processor. The software module may be located in a mature storage medium such as a random access memory, a flash memory, a read only memory, a programmable read only memory or an electrically erasable programmable memory, and a register. The storage medium is located in the memory 1120, and the processor 1130 reads information in the memory 1120 and completes the steps of the above method in combination with hardware thereof. To avoid repetition, no descriptions will be made herein.

Figure 12:
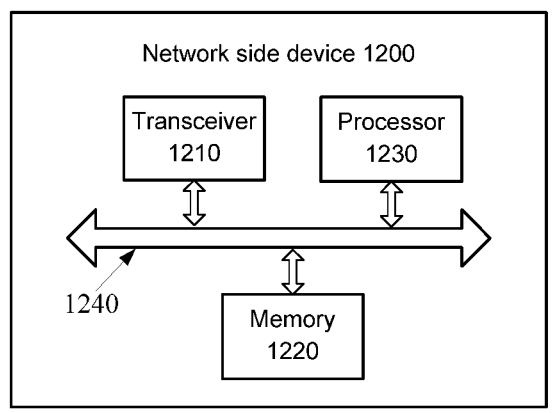
FIG. 12 is a schematic block diagram of a network side device according to a further embodiment of the present disclosure.

FIG. 12 is a schematic block diagram of a network side device 1200 according to a further embodiment of the present disclosure. As shown in FIG. 8, the network side device 1200 is provided. The network side device 1200 may include: a transceiver 1210, a memory 1220, a processor 1230, and a bus system 1240. The transceiver 1210, the memory 1220 and the processor 1230 are connected through the bus system 1240, the memory 1220 is configured to store an instruction, the processor 1230 is configured to execute the instruction stored in the memory 1220 to control the transceiver 1210 to transmit and send a signal.

The processor 1230 is configured to: determine at least one system information group which is updated, each of the at least one system information group including at least one piece of system information.

The transceiver 1210 is configured to: send at least one tag value message in one-to-one correspondence with the at least one system information group, wherein the at least one tag value group is in one-to-one correspondence with the at least one system information group, each of the at least one tag value group includes at least one tag value, and at least one tag value included in each tag value group is in one-to-one correspondence with at least one piece of system information included in the corresponding system information group.

In an alternative embodiment, as an example, the tag value message includes a paging message or a physical control channel message.

In an alternative embodiment, as an example, the at least one system information group includes at least two system information groups. The transceiver 1210 is configured to: send a tag value message corresponding to each of the at least two system information groups on a second transmission resource for transmitting a tag value message corresponding to each of the at least two system information groups, wherein tag value messages corresponding to different system information groups correspond to different second transmission resources; or send a tag value message corresponding to each of the at least two system information groups according to a second network temporary identity corresponding to the tag value message corresponding to each of the at least two system information groups, wherein tag value messages corresponding to different system information groups correspond to different second network temporary identities.

It is to be noted that the network side device 1200 may respond to a network side device in the data transmission of the method 200 and method 400 according to an embodiment of the present disclosure, and each module in the network side device 1200 and the other operations or functions described above are respectively intended to implement the corresponding processes performed by the network side device in various embodiments as shown in FIG. 2 and FIG. 4, and details are not described herein again for brevity.

It is to be understood that in the embodiment of the present disclosure, the processor 1230 may be a general-purpose CPU, a microprocessor, an ASIC, or one or more integrated circuits configured to execute the related program to implement the technical solution provided by the embodiment of the present disclosure.

The transceiver 1210 can realize communication between a mobile terminal and other devices or communication networks.

The memory 1220 may include a ROM and a RAM and provides instructions and data to the processor 1230. A portion of the processor 1230 may also include a non-volatile RAM. For example, the processor 1230 may also store information of a device type.

The bus system 1240 may further include, in addition to a data bus, a power bus, a control bus, a status signal bus or the like. However, for clarity of description, various buses are labeled as the bus system 1240 in the figure. In the implementation process, each step of the above method may be completed by an integrated logic circuit of hardware or an instruction in the form of software. Various steps of the method disclosed in the embodiment of the present disclosure may be directly implemented as being completely performed by a hardware processor by using the method for updating system information disclosed in the embodiment of the present disclosure through the processor 1230, or may be completely performed by a combination of hardware and software modules in the processor. The software module may be located in a mature storage medium such as a random access memory, a flash memory, a read only memory, a programmable read only memory or an electrically erasable programmable memory, and a register. The storage medium is located in the memory 1220, and the processor 1230 reads information in the memory 1220 and completes the steps of the above method in combination with hardware thereof. To avoid repetition, no descriptions will be made herein.

It is also to be understood that in the embodiment of the present disclosure, "B corresponding to A" means that B is associated with A, and B can be determined from A. However, it is also to be understood that determining B from A does not mean that B is determined merely from A, and that B can also be determined from A and/or other information.

It is to be understood that the term "and/or" herein is merely an association describing associated objects, indicating that there may be three relationships. For example, A and/or B may indicate that A exists separately, both A and B exist simultaneously, and B exists separately. In addition, the character "/" herein generally indicates that the contextual object is an "or" relationship.

It is to be understood that in various embodiments of the present disclosure, the size of the sequence numbers of the above processes does not mean the order of execution, and the order of execution of each process should be determined by its function and internal logic, and should not make any limitation to the implementation process of the embodiment of the present disclosure.

Those of ordinary skill in the art will appreciate that the units and algorithm steps of various examples described in combination with the embodiments disclosed herein can be implemented in electronic hardware or a combination of computer software and electronic hardware. Whether these functions are performed in hardware or software depends on the specific application and design constraints of the technical solution. Those skilled in the art can use different methods for implementing the described functions for each particular application, but such implementation should not be considered to be beyond the scope of the present disclosure.

Those skilled in the art can clearly understand that for the convenience and brevity of the description, the specific working process of the system, apparatus and unit described above may refer to the corresponding process in the foregoing method embodiment, and details are not described herein again.

In several embodiments provided by the present application, it is to be understood that the disclosed system, apparatus and method may be implemented in other manners. For example, the apparatus embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed may be indirect coupling or communication connection between apparatuses or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the present disclosure may be integrated into one processing unit, or each unit may exist physically separately, or two or more units may be integrated into one unit.

The technical features and descriptions in the above embodiments are applicable to other embodiments in order to make the application documents simple and clear. For example, the technical features of the method embodiments may be applied to apparatus embodiments or other method embodiments, and will not be repeated in other embodiments.

The functions may be stored in a computer-readable storage medium if being implemented in the form of a software functional unit and sold or used as a standalone product. Based on such understanding, the essence of the technical solution of the present disclosure or a part contributing to the conventional art or a part of the technical solution may be embodied in the form of a software product stored in a storage medium, including a plurality of instructions used to cause a computer device (which may be a personal computer, server, or network device, etc.) to perform all or part of the steps of the methods described in various embodiments of the present disclosure. The foregoing storage medium includes: a U disk, a mobile hard disk, a ROM, a RAM, a magnetic disk, or an optical disk, and the like, which may store a program code.

The above is only the specific implementation manner of the present disclosure, but the scope of protection of the present disclosure is not limited thereto. Any person skilled in the art can easily think of changes or replacements within the technical scope disclosed by the present disclosure, which should be covered by the scope of protection of the present disclosure. Therefore, the scope of protection of the present disclosure should be determined by the scope of the claims.

What is claimed is:

1. A method for updating system information, comprising:
    acquiring, by a terminal, at least one piece of indication information sent by a network side device,
    the at least one piece of indication information being configured to indicate that at least one system information group is updated,
    the at least one system information group being in one-to-one correspondence with the at least one piece of indication information, and
    the at least one system information group each comprising at least one piece of system information;
    determining, by the terminal, at least one piece of updated target system information of the at least one piece of system information in the at least one system information group; and
    acquiring, by the terminal, the at least one piece of updated target system information;
    wherein the at least one system information group comprises a first system information group, at least one piece of system information comprised in the first system information group belongs to public system information, and the at least one piece of indication information comprises first indication information for indicating that the first system information group is updated; and/or,
    the at least one system information group comprises a second system information group, at least one piece of system information comprised in the second system information group belongs to private system information, and the at least one piece of indication information comprises second indication information for indicating that the second system information group is updated.

2. The method as claimed in claim 1, wherein
acquiring, by the terminal, the at least one piece of indication information sent by the network side device comprises:
    determining, by the terminal, at least one indication domain from at least two indication domains which are in one-to-one correspondence with at least two system information groups and are comprised in one indication message, wherein each of the at least two indication domains is configured to carry information indicating whether the corresponding system information group is updated, each of the at least one indication domain currently carries information indicating that the corresponding system information group is updated, and the at least two system information groups comprise the at least one system information group; and
    acquiring, by the terminal, the at least one piece of indication information from the at least one indication domain;
or,
acquiring, by the terminal, the at least one piece of indication information sent by the network side device comprises:
    acquiring, by the terminal, at least two indication messages in one-to-one correspondence with at least two system information groups, wherein each of the at least two indication messages is configured to carry information indicating whether the corresponding system information group is updated, and the at least two system information groups comprise the at least one system information group; determining, by the terminal, at least one indication message from the at least two indication messages, each of the at least one indication message currently carrying information indicating that the corresponding system information group is updated; and
    acquiring, by the terminal, the at least one piece of indication information from the at least one indication message.

3. The method as claimed in claim 2, wherein
acquiring, by the terminal, the at least two indication messages in one-to-one correspondence with the at least two system information groups comprises:
    acquiring, by the terminal, an indication message corresponding to each of the at least two system information groups from a first transmission resource for transmitting an indication message corresponding to each of the at least two system information groups, wherein indication messages corresponding to different system information groups correspond to different first transmission resources; or,
    acquiring, by the terminal, an indication message corresponding to each of the at least two system information groups according to a first network temporary identity corresponding to the indication message corresponding to each of the at least two system information groups, wherein indication messages corresponding to different system information groups correspond to different first network temporary identities.

4. The method as claimed in claim 3, further comprising:
receiving, by the terminal, a first configuration message, the first configuration message comprising a corresponding relationship between an indication message corresponding to a system information group and a first transmission resource, or, the first configuration message comprising a corresponding relationship between an indication message corresponding to a system information group and a first network temporary identity.

5. The method as claimed in claim 1, further comprising:
acquiring, by the terminal, at least one tag value group sent by the network side device,
the at least one tag value group being in one-to-one correspondence with the at least one system information group,
the at least one tag value group each comprising at least one tag value, and
at least one tag value comprised in each of the at least one tag value group being in one-to-one correspondence with at least one piece of system information comprised in the corresponding system information group,
wherein determining, by the terminal, the at least one piece of updated target system information in each system information group comprises:
comparing, by the terminal, a tag value corresponding to each piece of system information in the at least one system information group sent by the network side device with a tag value of the corresponding system information stored by the terminal to determine the at least one piece of updated target system information in the at least one system information group.

6. The method as claimed in claim 5, wherein the at least one system information group comprises a plurality of system information groups, the at least one tag value group comprises a plurality of tag value groups in one-to-one correspondence with the plurality of system information groups, and
acquiring, by the terminal, the at least one tag value group sent by the network side device comprises:
acquiring, by the terminal, the plurality of tag value groups from one tag value message; or,
acquiring, by the terminal, a plurality of tag value messages in one-to-one correspondence with the plurality of system information groups, wherein each of the plurality of tag value messages is configured to carry a tag value group corresponding to the corresponding system information group.

7. The method as claimed in claim 6, wherein
acquiring, by the terminal, the plurality of tag value messages in one-to-one correspondence with the plurality of system information groups comprises:
acquiring, by the terminal, a tag value message corresponding to each of the plurality of system information groups from a second transmission resource for transmitting a tag value message corresponding to each of the plurality of system information groups, wherein tag value messages corresponding to different system information groups correspond to different second transmission resources; or,
acquiring, by the terminal, a tag value message corresponding to each of the plurality of system information groups according to a second network temporary identity corresponding to the tag value message corresponding to each of the plurality of system information groups, wherein tag value messages corresponding to different system information groups correspond to different second network temporary identities.

8. The method as claimed in claim 7, further comprising:
receiving, by the terminal, a second configuration message, the second configuration message comprising a corresponding relationship between a tag value message corresponding to a system information group and a second transmission resource, or, the second configuration message comprising a corresponding relationship between a tag value message corresponding to a system information group and a second network temporary identity.

9. The method as claimed in claim 1, wherein
acquiring, by the terminal, the at least one piece of indication information sent by the network side device comprises:
determining, by the terminal, the at least one system information group; and
monitoring, by the terminal, indication information corresponding to each of the at least one system information group.

10. A method for updating system information, comprising:
determining, by a network side device, at least one piece of indication information,
the at least one piece of indication information being configured to indicate that at least one system information group is updated,
the at least one system information group being in one-to-one correspondence with the at least one piece of indication information, and
the at least one system information group each comprising at least one piece of system information; and
sending, by the network side device, the at least one piece of indication information;
wherein the at least one system information group comprises a first system information group, at least one piece of system information comprised in the first system information group belongs to public system information, and the at least one Piece of indication information comprises first indication information for indicating whether the first system information group is updated; and/or,
the at least one system information group comprises a second system information group, at least one piece of system information comprised in the second system information group belongs to private system information, and the at least one piece of indication information comprises second indication information for indicating whether the second system information group is updated.

11. The method as claimed in claim 10, wherein
sending, by the network side device, the at least one piece of indication information comprises:
sending, by the network side device, the at least one piece of indication information through one indication message, wherein the one indication message comprises at least two indication domains in one-to-one correspondence with at least two system information groups, each of the at least two indication domains is configured to carry information indicating whether the corresponding system information group is updated, the at least two indication domains comprise at least one indication domain, the at least one indication domain carries the at least one piece of indication information in a one-to-one correspondence manner, and the at least two system information groups comprise the at least one system information group;
or,
sending, by the network side device, the at least one piece of indication information comprises: sending, by the network side device, at least two indication messages in one-to-one correspondence with at least two system information groups, wherein each of the at least two indication messages is configured to carry information indicating whether the corresponding system information group is updated, the at least two indication messages comprise at least one indication message, the at least one indication message carries the at least one piece of indication information in a one-to-one correspondence manner, and the at least two system information groups comprise the at least one system information group.

12. The method as claimed in claim 11, wherein
sending, by the network side device, at least two indication messages in one-to-one correspondence with the at least two system information groups comprises:
sending, by the network side device, an indication message corresponding to each of the at least two system information groups on a first transmission resource for transmitting an indication message corresponding to each of the at least two system information groups, wherein indication messages corresponding to different system information groups correspond to different first transmission resources; or,
sending, by the network side device, an indication message corresponding to each of the at least two system information groups according to a first network temporary identity corresponding to the indication message corresponding to each of the at least two system information groups, wherein different system information groups correspond to different first network temporary identities.

13. The method as claimed in claim 12, wherein
the network side device sends a first configuration message, the first configuration message comprising a corresponding relationship between an indication message corresponding to a system information group and a first transmission resource, or, the first configuration message comprising a corresponding relationship between an indication message corresponding to a system information group and a first network temporary identity.

14. The method as claimed in claim 10, further comprising:
sending, by the network side device, at least one tag value group, the at least one tag value group being in one-to-one correspondence with the at least one system information group, the at least one tag value group each comprising at least one tag value, and at least one tag value comprised in each tag value group being in one-to-one correspondence with at least one piece of system information comprised in the corresponding system information group.

15. The method as claimed in claim 14, wherein the at least one system information group comprises a plurality of system information groups, the at least one tag value group comprises a plurality of tag value groups in one-to-one correspondence with the plurality of system information groups, and
sending, by the network side device, at least one tag value group comprises:
sending, by the network side device, one tag value message carrying the plurality of tag value groups; or,
sending, by the network side device, a plurality of tag value messages in one-to-one correspondence with the plurality of system information groups, wherein each of the plurality of tag value messages is configured to carry a tag value group corresponding to the corresponding system information group.

16. The method as claimed in claim 15, wherein
sending, by the network side device, the plurality of tag value messages in one-to-one correspondence with the plurality of system information groups comprises:
sending, by the network side device, a tag value message corresponding to each of the plurality of system information groups on a second transmission resource for transmitting a tag value message corresponding to each of the plurality of system information groups, wherein tag value messages corresponding to different system information groups correspond to different second transmission resources; or,
sending, by the network side device, a tag value message corresponding to each of the plurality of system information groups according to a second network temporary identity corresponding to the tag value message corresponding to each of the plurality of system information groups, wherein tag value messages corresponding to different system information groups correspond to different second network temporary identities.

17. The method as claimed in claim 16, further comprising:
sending, by the network side device, a second configuration message, the second configuration message comprising a corresponding relationship between a tag value message corresponding to a system information group and a second transmission resource, or, the second configuration message comprising a corresponding relationship between a tag value message corresponding to a system information group and a second network temporary identity.

18. A terminal, comprising:
at least one processor; and
a computer readable storage, coupled to the at least one processor and storing at least one computer executable instructions thereon, which when the at least one computer executable instructions is executed by the at least one processor, cause the at least one processor to carry out following actions:
acquiring, by a terminal, at least one piece of indication information sent by a network side device, the at least one piece of indication information being configured to indicate that at least one system information group is updated, the at least one system information group being in one-to-one correspondence with the at least one piece of indication information, and the at least one system information group each comprising at least one piece of system information;
determining, by the terminal, at least one piece of updated target system information of the at least one piece of system information in the at least one system information group; and
acquiring, by the terminal, the at least one piece of updated target system information;
wherein the at least one system information group comprises a first system information group, at least one piece of system information comprised in the first system information group belongs to public system information, and the at least one piece of indication information comprises first indication information for indicating that the first system information group is updated; and/or,
the at least one system information group comprises a second system information group, at least one piece of system information comprised in the second system information group belongs to private system information, and the at least one piece of indication information comprises second indication information for indicating that the second system information group is updated.

* * * * *